(12) United States Patent
Dorsey et al.

(10) Patent No.: US 9,381,697 B2
(45) Date of Patent: **\*Jul. 5, 2016**

(54) THERMOPLASTIC FILMS WITH VISUALLY-DISTINCT STRETCHED REGIONS AND METHODS FOR MAKING THE SAME

(75) Inventors: Robert T. Dorsey, Western Springs, IL (US); Michael G. Borchardt, Naperville, IL (US)

(73) Assignee: The Glad Products Company, Oakland, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/454,412

(22) Filed: Apr. 24, 2012

(65) Prior Publication Data

US 2012/0269465 A1 Oct. 25, 2012

Related U.S. Application Data

(60) Provisional application No. 61/478,639, filed on Apr. 25, 2011.

(51) Int. Cl.
| | | |
|---|---|---|
| *B29C 55/18* | (2006.01) | |
| *B65D 30/00* | (2006.01) | |
| *B65D 33/01* | (2006.01) | |
| *B29C 55/06* | (2006.01) | |
| *B29C 55/08* | (2006.01) | |

(52) U.S. Cl.
CPC .............. *B29C 55/18* (2013.01); *B65D 31/00* (2013.01); *B65D 33/01* (2013.01); *B29C 55/06* (2013.01); *B29C 55/08* (2013.01); *Y02W 90/11* (2015.05); *Y10T 428/2457* (2015.01); *Y10T 428/24942* (2015.01)

(58) Field of Classification Search
CPC ........ B65D 29/02; B65D 31/00; B65D 31/02; B65D 31/10; B65D 31/16; B65D 33/02; B65D 88/165; B65D 88/1631; B65D 33/01; B65D 88/1625; B29C 55/18; B29C 55/06; B29C 55/08; Y10T 428/2457; Y10T 428/25942
USPC .............................. 383/105, 118, 119, 71–76
See application file for complete search history.

(56) References Cited

U.S. PATENT DOCUMENTS

| | | | | |
|---|---|---|---|---|
| 2,593,328 | A | * 4/1952 | Meaker ......................... | 383/101 |
| 2,714,571 | A |   8/1955 | Irion et al. | |
| 3,029,853 | A | * 4/1962 | Piazze ............................. | 383/75 |
| 3,058,868 | A |  10/1962 | Schroeder | |
| 3,130,647 | A | * 4/1964 | Anderson et al. ............. | 493/193 |
| 3,220,057 | A | * 11/1965 | Walton ........................... | 425/385 |

(Continued)

FOREIGN PATENT DOCUMENTS

| | | |
|---|---|---|
| WO | WO9013702 | 11/1990 |
| WO | WO9956953 | 11/1999 |

*Primary Examiner* — Nathan J Newhouse
*Assistant Examiner* — Peter Helvey
(74) *Attorney, Agent, or Firm* — Thomas C. Feix

(57) ABSTRACT

Thermoplastic films include intermittent stretched regions that are visually distinct from un-stretched regions. The stretched regions can be white, opaque, and non porous. The thermoplastic films with visually-distinct stretched regions can be formed into bags for use as trash can liners or food storage. Additionally, methods of stretching thermoplastic films to create non-porous, white, and opaque stretched regions include incrementally stretching a film of a thermoplastic material and a voiding agent.

20 Claims, 17 Drawing Sheets

(56) References Cited

U.S. PATENT DOCUMENTS

| | | | |
|---|---|---|---|
| 3,224,574 A * | 12/1965 | McConnell et al. | 242/160.1 |
| 3,318,759 A * | 5/1967 | Anderson | 428/340 |
| 3,322,613 A * | 5/1967 | Rasmussen | 428/484.1 |
| 3,485,437 A * | 12/1969 | Gruentzel et al. | 383/107 |
| 3,494,457 A * | 2/1970 | Titchenal | 206/484 |
| 3,549,381 A * | 12/1970 | Kinsinger | 426/77 |
| 3,550,839 A * | 12/1970 | Clayton et al. | 383/116 |
| 3,622,422 A | 11/1971 | Newman et al. | |
| 3,735,918 A * | 5/1973 | Tundermann | 383/32 |
| 3,746,607 A * | 7/1973 | Harmon et al. | 428/167 |
| 3,760,940 A * | 9/1973 | Bustin | 383/35 |
| 3,772,968 A * | 11/1973 | Ruda | 493/225 |
| 3,857,144 A | 12/1974 | Bustin | |
| 3,973,063 A * | 8/1976 | Clayton | 428/35.2 |
| 3,984,047 A * | 10/1976 | Clayton et al. | 383/119 |
| 4,076,121 A * | 2/1978 | Clayton et al. | 206/390 |
| 4,116,892 A | 9/1978 | Schwarz | |
| 4,153,664 A | 5/1979 | Sabee | |
| 4,153,751 A | 5/1979 | Schwarz | |
| 4,273,549 A * | 6/1981 | Pezzana et al. | 493/196 |
| 4,289,832 A | 9/1981 | Schwarz | |
| 4,302,495 A | 11/1981 | Marra | |
| 4,343,848 A | 8/1982 | Leonard, Jr. | |
| 4,379,197 A | 4/1983 | Cipriani | |
| 4,438,167 A | 3/1984 | Schwarz | |
| 4,517,714 A | 5/1985 | Sneed et al. | |
| 4,518,643 A * | 5/1985 | Francis | 428/131 |
| 4,522,203 A | 6/1985 | Mays | |
| 4,614,679 A | 9/1986 | Farrington, Jr. et al. | |
| 4,629,064 A * | 12/1986 | Barner | 206/204 |
| 4,692,368 A | 9/1987 | Taylor et al. | |
| 4,704,238 A | 11/1987 | Okuyama et al. | |
| 4,753,840 A | 6/1988 | Van Gompel | |
| 4,793,885 A * | 12/1988 | Rasmussen | 156/200 |
| 4,814,135 A | 3/1989 | Heitz | |
| 4,846,586 A * | 7/1989 | Bruno | 383/9 |
| 4,857,600 A | 8/1989 | Gross et al. | |
| 4,890,936 A * | 1/1990 | Cooper | 383/109 |
| 4,925,711 A * | 5/1990 | Akao et al. | 428/35.2 |
| 4,930,905 A | 6/1990 | Sharps, Jr. | |
| 4,993,844 A * | 2/1991 | Robinson et al. | 383/38 |
| 5,028,289 A * | 7/1991 | Rasmussen | 156/229 |
| 5,035,941 A | 7/1991 | Blackburn | |
| 5,076,988 A | 12/1991 | Rifi | |
| 5,078,508 A * | 1/1992 | Johan et al. | 383/75 |
| 5,100,721 A | 3/1992 | Akao | |
| 5,133,607 A * | 7/1992 | Bonke | 383/75 |
| 5,153,382 A | 10/1992 | Gross et al. | |
| 5,167,897 A * | 12/1992 | Weber et al. | 264/288.8 |
| 5,205,650 A * | 4/1993 | Rasmussen | 383/107 |
| 5,293,184 A * | 3/1994 | Ishizuka | 347/1 |
| 5,296,184 A | 3/1994 | Wu et al. | |
| 5,382,461 A | 1/1995 | Wu | |
| 5,390,875 A * | 2/1995 | Gietman et al. | 242/521 |
| 5,422,172 A | 6/1995 | Wu | |
| 5,455,992 A * | 10/1995 | Kurschatke et al. | 26/99 |
| 5,518,801 A | 5/1996 | Chappell et al. | |
| 5,554,093 A * | 9/1996 | Porchia et al. | 493/240 |
| 5,618,111 A * | 4/1997 | Porchia et al. | 383/63 |
| 5,650,214 A * | 7/1997 | Anderson et al. | 428/152 |
| 5,716,137 A * | 2/1998 | Meyer | 383/75 |
| 5,804,265 A * | 9/1998 | Saad et al. | 428/35.2 |
| 5,851,937 A | 12/1998 | Wu et al. | |
| 5,861,074 A | 1/1999 | Wu | |
| 5,865,926 A | 2/1999 | Wu et al. | |
| 5,881,883 A * | 3/1999 | Siegelman | 206/720 |
| 5,885,262 A * | 3/1999 | Wheeler | 604/327 |
| 6,013,151 A | 1/2000 | Wu et al. | |
| 6,059,458 A * | 5/2000 | Belias et al. | 383/75 |
| 6,139,185 A | 10/2000 | Hamilton et al. | |
| 6,139,186 A * | 10/2000 | Fraser | 383/77 |
| 6,150,647 A | 11/2000 | Anderson et al. | |
| 6,183,856 B1 * | 2/2001 | Amon | 428/318.4 |
| 6,194,060 B1 * | 2/2001 | Amon et al. | 428/315.9 |
| 6,214,147 B1 | 4/2001 | Mortellite et al. | |
| 6,254,736 B1 | 7/2001 | Earl et al. | |
| 6,264,872 B1 * | 7/2001 | Majors et al. | 264/284 |
| 6,265,045 B1 | 7/2001 | Mushaben | |
| 6,361,784 B1 | 3/2002 | Brennan et al. | |
| 6,368,444 B1 * | 4/2002 | Jameson et al. | 156/229 |
| 6,385,818 B1 | 5/2002 | Savicki, Sr. | |
| 6,394,651 B2 | 5/2002 | Jackson | |
| 6,394,652 B2 | 5/2002 | Meyer et al. | |
| 6,402,377 B1 * | 6/2002 | Vo et al. | 383/75 |
| 6,416,452 B1 * | 7/2002 | Meyer | 493/210 |
| 6,513,975 B1 | 2/2003 | Jackson et al. | |
| 6,569,527 B1 * | 5/2003 | Calhoun et al. | 428/402 |
| 6,695,476 B2 | 2/2004 | Jackson et al. | |
| 6,799,680 B2 * | 10/2004 | Mak | 206/524.8 |
| 6,939,042 B2 * | 9/2005 | Rusnak et al. | 383/71 |
| 6,966,697 B2 * | 11/2005 | Patridge et al. | 383/107 |
| 7,132,151 B2 * | 11/2006 | Rasmussen | 428/182 |
| 7,220,053 B2 * | 5/2007 | Wu | 383/105 |
| 7,270,861 B2 * | 9/2007 | Broering et al. | 428/35.7 |
| 7,306,729 B2 | 12/2007 | Bacino et al. | |
| 7,687,134 B2 * | 3/2010 | Withers | 428/156 |
| 7,901,758 B2 | 3/2011 | Rasmussen | |
| 7,938,635 B2 * | 5/2011 | Heilman et al. | 425/101 |
| 8,263,210 B2 * | 9/2012 | Rasmussen | 428/174 |
| 8,309,206 B2 * | 11/2012 | Rasmussen | 428/156 |
| 8,557,364 B2 * | 10/2013 | Rasmussen | 428/114 |
| 2002/0074691 A1 | 6/2002 | Mortellite et al. | |
| 2002/0187361 A1 * | 12/2002 | Amon | 428/516 |
| 2003/0007704 A1 * | 1/2003 | Miller | 383/76 |
| 2003/0024625 A1 * | 2/2003 | McAmish et al. | 156/73.1 |
| 2004/0134923 A1 | 7/2004 | Aquino et al. | |
| 2004/0179754 A1 * | 9/2004 | Taheri | 383/38 |
| 2005/0123726 A1 * | 6/2005 | Broering et al. | 428/172 |
| 2005/0129337 A1 * | 6/2005 | Sabounjian | 383/117 |
| 2006/0083900 A1 * | 4/2006 | Ashraf | 428/182 |
| 2006/0093766 A1 | 5/2006 | Savicki et al. | |
| 2006/0148915 A1 * | 7/2006 | Floyd et al. | 521/61 |
| 2006/0177161 A1 * | 8/2006 | Turvey | 383/120 |
| 2007/0166503 A1 | 7/2007 | Hannigan | |
| 2007/0254120 A1 * | 11/2007 | Rasmussen | 428/35.7 |
| 2007/0257402 A1 * | 11/2007 | Rasmussen | 264/339 |
| 2008/0031553 A1 * | 2/2008 | Tokita et al. | 383/113 |
| 2008/0124461 A1 | 5/2008 | Leener et al. | |
| 2008/0137995 A1 * | 6/2008 | Fraser et al. | 383/75 |
| 2008/0241769 A1 * | 10/2008 | Quintens et al. | 430/349 |
| 2009/0003736 A1 * | 1/2009 | Alipour et al. | 383/42 |
| 2009/0029114 A1 | 1/2009 | Cancio et al. | |
| 2009/0068427 A1 * | 3/2009 | Patel et al. | 428/212 |
| 2009/0233041 A1 * | 9/2009 | Rasmussen | 428/101 |
| 2009/0264847 A1 * | 10/2009 | Ashton et al. | 604/367 |
| 2010/0040875 A1 * | 2/2010 | Patel et al. | 428/338 |
| 2010/0046860 A1 * | 2/2010 | Kent et al. | 383/75 |
| 2010/0046861 A1 * | 2/2010 | Wilcoxen | 383/119 |
| 2010/0098354 A1 * | 4/2010 | Fraser et al. | 383/72 |
| 2010/0195937 A1 * | 8/2010 | Fraser et al. | 383/105 |
| 2011/0052104 A1 * | 3/2011 | Wilcoxen et al. | 383/75 |
| 2011/0052105 A1 * | 3/2011 | Wilcoxen et al. | 383/75 |
| 2011/0117307 A1 * | 5/2011 | Fraser et al. | 428/66.6 |
| 2011/0255809 A1 * | 10/2011 | Tucker et al. | 383/119 |
| 2011/0317945 A1 * | 12/2011 | Waldron et al. | 383/119 |
| 2012/0033900 A1 * | 2/2012 | Fraser et al. | 383/105 |
| 2012/0039550 A1 * | 2/2012 | MacPherson et al. | 383/109 |
| 2012/0057811 A1 * | 3/2012 | Tucker et al. | 383/72 |
| 2012/0063706 A1 * | 3/2012 | Fraser et al. | 383/109 |
| 2013/0202853 A1 * | 8/2013 | Bergman et al. | 428/167 |
| 2013/0209711 A1 * | 8/2013 | Borchardt et al. | 428/34.8 |
| 2013/0209712 A1 * | 8/2013 | Borchardt et al. | 428/34.8 |

* cited by examiner

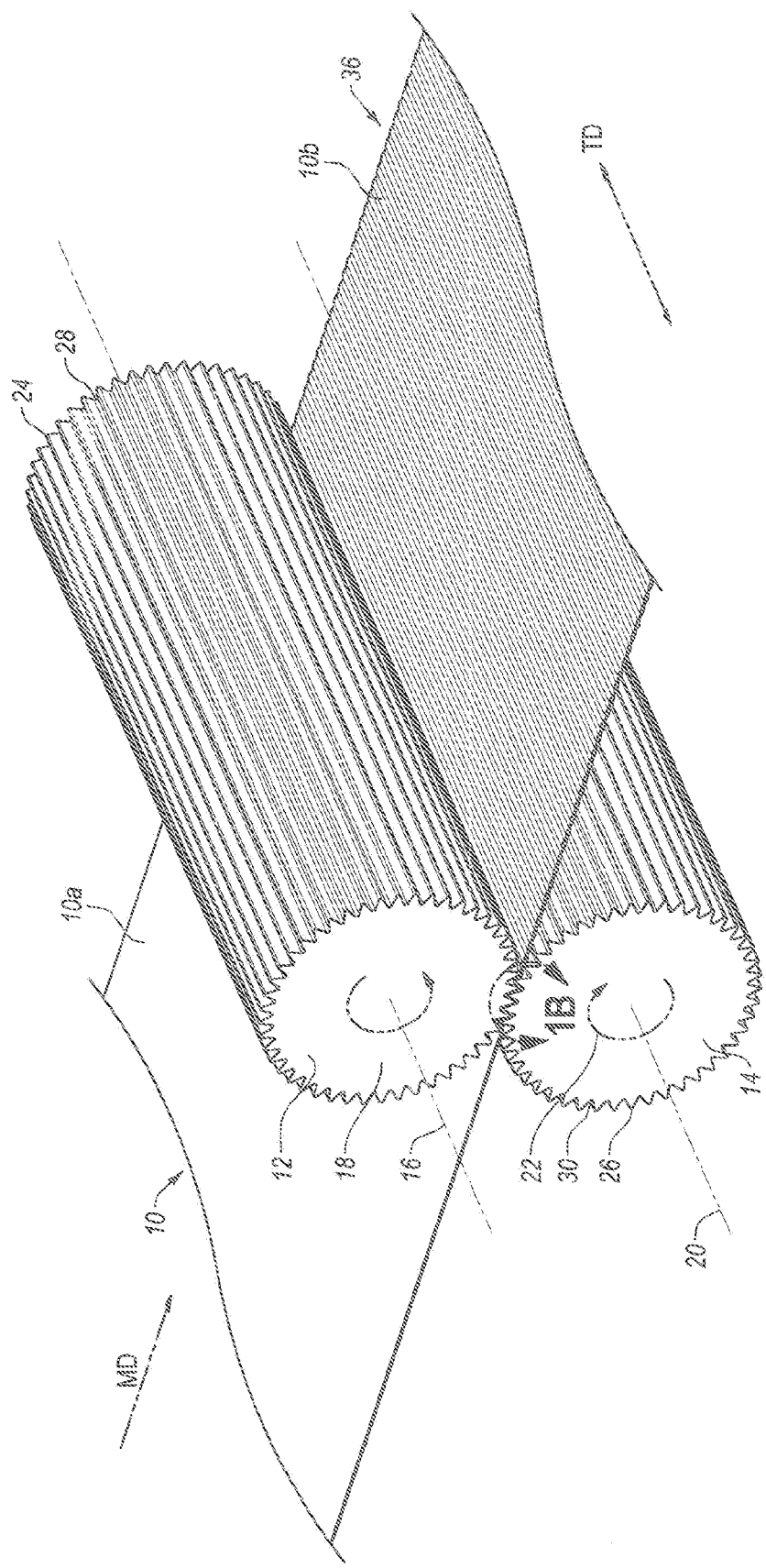

THERMOPLASTIC FILMS WITH VISUALLY-DISTINCT STRETCHED REGIONS AND METHODS FOR MAKING THE SAME

CROSS-REFERENCE TO RELATED APPLICATIONS

This application claims the benefit of U.S. Provisional Application No. 61/478,639, filed Apr. 25, 2011, which is hereby incorporated by reference in its entirety.

BACKGROUND OF THE INVENTION

1. The Field of the Invention

The present invention relates generally to thermoplastic films. Specifically, the invention relates to stretched thermoplastic films with visual effects created by voiding agents.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for use its intended use. For example, manufacturers may attempt to increase or otherwise control the tensile strength, tear resistance, impact resistance, and breathability of a thermoplastic film. One way manufacturers may attempt to control or change the material properties of a thermoplastic film is by stretching the film. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

Common ways of stretching film in the machine direction include machine direction orientation ("MDO") and incremental stretching. MDO involves stretching the film between two pairs of smooth rollers. Commonly MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. For example, if the first pair of rollers is rotating at 100 feet per minute ("fpm") and the second pair of rollers is rotating at 500 fpm, the rollers will stretch the film to roughly five times its original length. MDO stretches the film continuously in the machine direction and is often used to create an oriented film.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are spaced across the film. The depth at which the intermeshing teeth engage can control the degree of stretching. Often, incremental stretching of films is referred to as ring rolling.

In connection with stretching a film, manufacturers may add a voiding agent to the film. Upon stretching, the voiding agent can create voids in the film; thereby, producing a breathable film. Manufacturers commonly use relatively large amounts of filler (50% by weight) and/or heat the film to an elevated temperature during stretching when creating breathable or porous films.

In addition to allowing for the modification or tailoring of the strength and the breathability of a film, stretching of a film can also reduce the thickness of the film. Stretched films of reduced thickness can allow manufacturers to use less thermoplastic material to form a product of a given surface area or size. Reducing the gauge of a film; however, can make the film more transparent or translucent. Consumers commonly associate thinner films and/or transparent films with weakness; and thus, may be dissuaded to purchase stretched films. Manufacturers may add pigments, such as $TiO_2$, to add either color or opacity to thinner films. Unfortunately, additives, such as $TiO_2$ can be expensive and often negatively impact the film strength properties, especially as the additive concentration is increased. Furthermore, even pigmented films commonly become less opaque upon stretching.

One common use of thermoplastic films is as bags for liners in trash or refuse receptacles. It is often undesirable to use porous or breathable films in trash bags as the voids in porous films may allow odor and/or liquids to escape from the bag. Additionally, many consumers may prefer opaque and non-transparent trash bags that prevent others (i.e., neighbors) from viewing the contents in the trash bag.

Another common use of thermoplastic films is as flexible plastic bags for storing food items. Similar to trash bags, in some instances it may be undesirable to use porous or breathable films in food storage bags because the voids in porous films can allow air and/or germs to reach and spoil the food within food storage bag. In other instances, however, a breathable food storage bag may be desirable. For example, a breathable food storage bag may be desirable when storing fruit and/or vegetables.

Accordingly, there are a number of considerations to be made in thermoplastic films and manufacturing methods.

BRIEF SUMMARY OF THE INVENTION

Implementations of the present invention solve one or more problems in the art with apparatus and methods for creating films with visually-distinct stretched regions. In particular, one or more implementations of the present invention include incrementally stretching films formed from a thermoplastic material and a voiding agent. Upon stretching, the voiding agent can cause the stretched regions of the film to become more opaque than un-stretched regions of the film. Additionally, one or more implementations of the present invention include methods of incrementally-stretching films to create visually-distinct stretched regions.

For example, one implementation of a thermoplastic film can include a first plurality of un-stretched regions. The film can also include a second plurality of stretched regions intermittently dispersed about the first plurality of un-stretched regions. The stretched regions can be non-porous and more opaque than the un-stretched regions.

Additionally, one or more implementations of the present invention include a thermoplastic bag that includes first and second sidewalls. The first and second sidewalls can be joined along three edges. The thermoplastic bag can include a plurality of un-stretched regions formed in one or more of the first sidewall or the second sidewall. The un-stretched regions can have a first average thickness. The thermoplastic bag can also include a plurality of stretched regions intermittently dispersed about the un-stretched regions. The stretched regions can have a second average thickness that is smaller than the first average thickness. Additionally, the stretched regions can be more opaque then un-stretched regions.

In addition to the forgoing, a method for incrementally stretching a film to create visually distinct regions can involve providing a thermoplastic film. The thermoplastic film can comprise between about 65 and about 99 percent by weight of a thermoplastic material and between about 1 and about 35 percent by weight of a voiding agent. The method can also involve cold stretching the film to create non-porous stretched regions intermittingly dispersed among un-stretched regions. The stretched regions can be more opaque than the un-stretched regions of the film.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 1A illustrates a schematic diagram of a thermoplastic film being incrementally stretched by MD intermeshing rollers in accordance with one or more implementations of the present invention;

DETAILED DESCRIPTION OF THE PREFERRED EMBODIMENTS

Figure 1B:
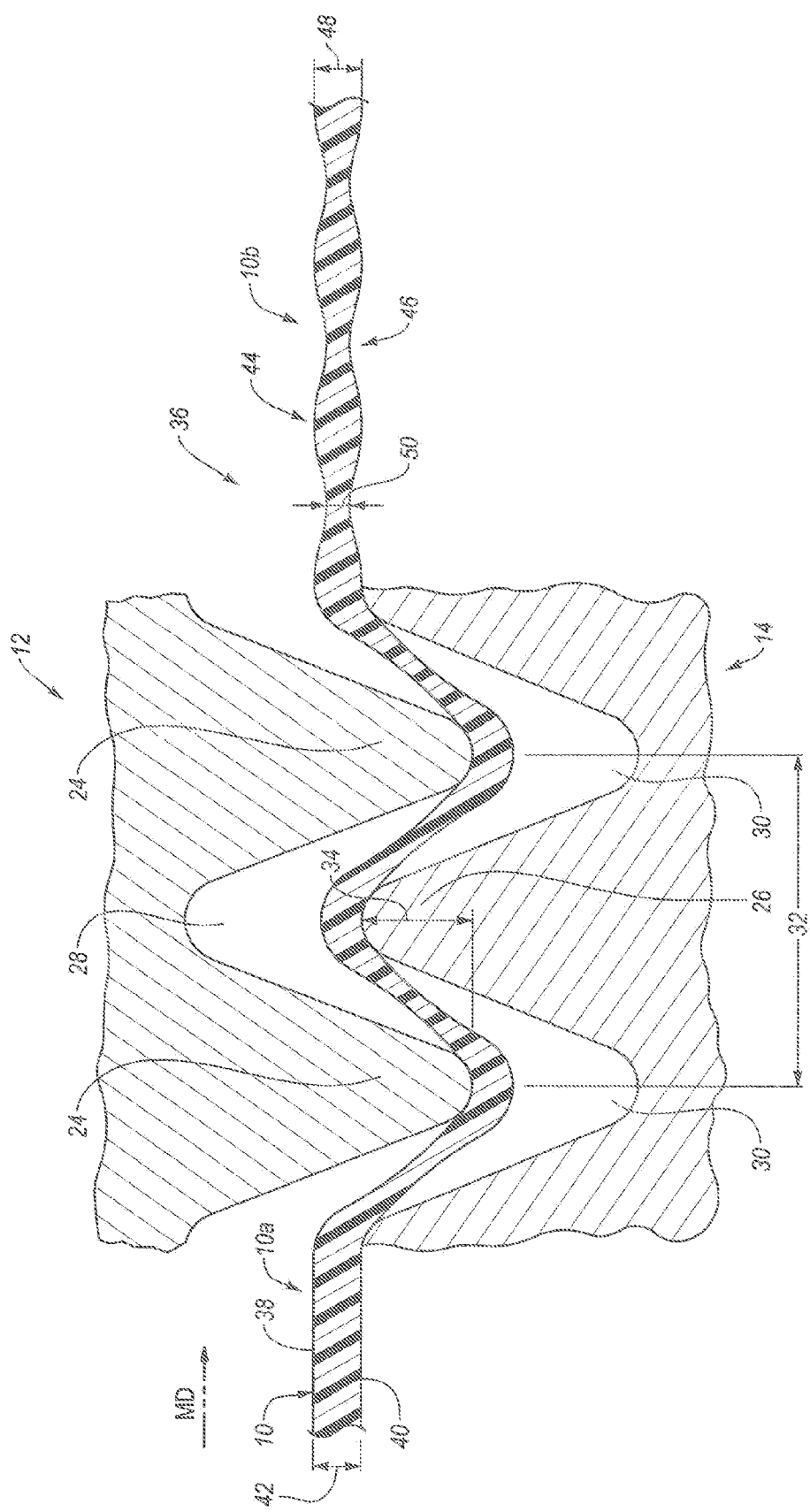
FIG. 1B illustrates an enlarged view of a portion of the thermoplastic film passing through the intermeshing rollers of FIG. 1A taken along the circle 1B of FIG. 1.

One or more implementations of the present invention include apparatus and methods for creating films with visually-distinct stretched regions. In particular, one or more implementations of the present invention include incrementally stretching films formed from a thermoplastic material and a voiding agent. Upon stretching, the voiding agent can cause the stretched regions of the film to become more opaque than un-stretched regions of the film. Additionally, one or more implementations of the present invention include methods of incrementally-stretching films to create visually-distinct stretched regions.

Indeed, one or more implementations of the present invention can provide thermoplastic films, and products made therefrom, with visually-distinct stretched regions. As used herein, the term "visually distinct" refers to a feature that is more opaque and potentially a different color from another feature in a manner that is visible to the naked eye. In one or more implementations, the visually-distinct stretched regions can be white and opaque. The opacity of the visually-distinct stretched regions can make the stretched regions appear thick and can connote strength to a consumer.

In addition to the foregoing, one or more implementations provide stretched thermoplastic films with visually distinct regions that consumers can associate with improved properties created by stretching the film. For example, the visually distinct regions can indicate that those regions have undergone a transformation to impart a desirable characteristic to that region (e.g., increased strength or elasticity). Thus, the visually distinct regions can serve to notify a consumer that the thermoplastic film has been processed to improve the film.

Furthermore, different areas of a film can include different types of stretching; and thus, different strength characteristics. The different visually-distinct stretched regions created by the different types of stretching can serve to notify the consumer that the different areas or zones of the film have been tailored with different characteristics. For example, one or more implementations of the present invention includes using MD ring rolling, TD ring rolling, diagonal direction ("DD") ring rolling, and the formation of strainable networks, and combinations thereof to create different stress-whitened patterns in a film. As used herein, "stress-whitening" or "stress-whitened" refers to a film becoming more opaque and/or whiter upon stretching. In addition to different types of stretching, intermeshing rollers with different tooth pitches and/or layouts can allow for the creation of visually-distinct stress-whitened patterns in a film. Also, the film can include one or more pigments of a color other than white. Thus upon stretching, the whitened stretched regions can contrast with the colored un-stretched regions.

Additionally, consumers may associate thinner films with decreased strength. Indeed, such consumers may feel that they are receiving less value for their money when purchasing thermoplastic film products with thinner gauges. One will appreciate in light of the disclosure herein that a consumer may not readily detect that one or more incrementally-stretched films of the present invention have a reduced gauge. In particular, by imparting an alternating pattern of visually distinct regions, the consumer may perceive the more opaque regions as being thicker and/or having increased strength.

As explained in greater detail below, the use of a voiding agent to create visually-distinct stretched regions can allow a manufacturer to use less pigments, such as $TiO_2$, to color or add opacity to a film. The reduction in pigments can lead to significant cost savings. Furthermore, pigments can become less effective as a film is stretched; thus, one or more implementations of the implementations of the present invention can be more effective in adding opacity to stretched films than pigments alone.

As alluded to previously, voiding agents are commonly added to films so as to create porous or breathable films upon stretching. One or more implementations include adding relatively small amounts of a voiding agent(s) and/or stretching the film under ambient or cold (non-heated) conditions to allow for the creation of stress-whitened regions without creating a porous film. This differs significantly from most conventional processes that stretch films including voiding agents. In particular, most conventional processes that stretch films including voiding agents stretch the films under heated conditions and include relatively large amounts of the voiding agent. Stretching under ambient or cold conditions in accordance with one or more implementations can constrain the molecules in the film so they are not as easily oriented as under heated conditions, so as to help prevent the creation of a porous film.

Film Materials

As an initial matter, in one or more implementations the films (e.g., 10-10e of FIGS. 1A-9) can comprise a thermoplastic material and a voiding agent. In alterative implementations, the films (e.g., 10-10c of FIGS. 1A-9) may comprise a thermoplastic material(s) that stress whitens without a voiding agent. The thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

In at least one implementation of the present invention, the film can include linear low density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some implementations of the present invention can use an octene comonomer, solution phase LLDPE (MI=1.1; $\rho$=0.920). Additionally, other implementations of the present invention can use a gas phase LLDPE, which is a hexene gas phase LLDPE formulated with slip/AB (MI=1.0; $\rho$=0.920). One will appreciate that the present invention is not limited to LLDPE, and can include "high density polyethylene" (HDPE), "low density polyethylene" (LDPE), and "very low density polyethylene" (VLDPE). Indeed films made from any of the previously mentioned thermoplastic materials or combinations thereof can be suitable for use with the present invention.

LLDPE will typically not stress whiten without a voiding agent. Thus, films of one or more implementations of the present invention including LLDPE may also include a voiding agent. Furthermore, LLDPE is typically not a candidate material for conventional film orientations methods because its relatively high crystallinity can result in a relatively sharp melting point. The relatively sharp melting point can make LLDPE difficult to process. As such, stretching LLDPE by conventional means with voiding agents to create breathable films can be difficult.

Indeed, implementations of the present invention can include any flexible or pliable thermoplastic material which may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to a thermoplastic material, the films of one or more implementations of the present invention can also include a voiding agent. Some examples of voiding agents suitable for use in the present invention include calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, etc. One will appreciate in light of the disclosure herein that the foregoing list of voiding agents are examples of some of the voiding agents that may be suitable for use with the present invention.

Films of one or more implementations of the present invention may include other voiding agents, or combinations of any of the previously mentioned voiding agents. Indeed, in one or more implementations, the voiding agent any be any inorganic or organic material with a relatively lower elasticity than the thermoplastic material of the film. In one or more implementations, calcium carbonate may be particularly suitable for its whiteness, inert characteristic, low cost, and availability.

In addition to a thermoplastic material and a voiding agent, films of one or more implementations of the present invention can also include one or more additives. For examples, the films can include pigments, slip agents, anti-block agents, or tackifiers. The pigments can include $TiO_2$, or other pigments, that can impart a color and/or opacity to the film.

One will appreciate in light of the disclosure herein that manufacturers may form the films or webs to be used with the present invention using a wide variety of techniques. For example, a manufacturer can form precursor mix of the thermoplastic material, a voiding agent, and one or more additives. The manufacturer can then form the film(s) from the precursor mix using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

In one or more implementations, the films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

As used herein, the term "starting gauge" or "initial gauge" refers to the average distance between the major surfaces of a film before it is incrementally stretched. The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present invention may not be uniform. Thus, the starting gauge of films of one or more implementations of the present invention may vary along the length and/or width of the film.

In one or more implementations of the present invention, the incrementally-stretched films with visually-distinct stretched regions are non porous or non breathable. As used herein, the terms "non porous" and "non breathable" refer to a films that are liquid impermeable and at least substantially gas/vapor impermeable. Thus, a non-porous or non-breathable film may not allow liquids or gases to pass there through. Because the incrementally-stretched films with visually-distinct stretched regions of one or more implementations are non porous or non breathable, they may be particularly suited for use in trash liners or food storage bags. In one or more additional implementations, the incrementally-stretched films with visually-distinct stretched regions may be liquid impermeable, yet gas/vapor permeable. Such incrementally-stretched films with visually-distinct stretched regions of one or more implementations may be particularly suited for use in food storage bags.

It should be noted that the non-porous or non-breathable films of the present invention can include voids. The voids can create the stress-whitened and/or opaque appearance in the stretched regions. One will appreciate, however, that the size, number, and/or depth of the voids may prevent liquid from passing through the film. Furthermore, in some implementations, the size, number, and/or depth of the voids may substantially prevent gases and vapors from passing through the film. In still further implementations, the size, number, and/or depth of the voids may completely prevent gases and vapors from passing through the film.

The size, number, and/or depth of the voids can be controlled to ensure a non-porous film by controlling one or more of the amount of the voiding agent in the film, the degree or amount of stretching, and the temperature of the film upon stretching. For example, in one or more implementations the percent weight of the voiding agent in the film can be suitably between about 1% and about 35%, suitably between about 1% and about 30%, suitably between about 5% and about 25%, suitably between about 5% and about 20%, and suitably between about 10% and about 15%.

Additionally, one or more implementations include incrementally stretching the film under ambient or cold (non-heated) conditions. Furthermore, one or more implementations include stretching the film at ratios less than about 1:3. In other words, one or more implementations include stretching the film less than about 3 times its original dimension (e.g., length, width). Suitably one or more implementations include stretching the film less than about 1.5 times its original dimension (e.g., length, width).

Referring now to the Figures, FIGS. 1A and 1B illustrate one exemplary process of incrementally stretching a thermoplastic film to create visually-distinct stretched regions in accordance with an implementation of the present invention. In particular, FIGS. 1A and 1B illustrate an MD ring rolling process that incrementally stretches a thermoplastic film 10 by passing the film 10 through a pair of MD intermeshing rollers 12, 14. The MD ring rolling processes of the present invention can stretch the film 10 in the machine direction.

As shown by the FIGS. 1A and 1B, the first roller 12 and the second roller 14 can each have a generally cylindrical shape. The rollers 12, 14 may be made of cast and/or machined metal, such as, steel, aluminum, or any other suitable material. The rollers 12, 14 can rotate in opposite direction about parallel axes of rotation. For example, FIG. 1A illustrates that the first roller 12 can rotate about a first axis 16 of rotation in a counterclockwise direction 18. FIG. 1A also illustrates that the second roller 14 can rotate about a second axis 20 of rotation in a clockwise direction 22. The axes of rotation 16, 20 can be parallel to the transverse direction and perpendicular to the machine direction.

The intermeshing rollers 12, 14 can closely resemble fine pitch spur gears. In particular, the rollers 12, 14 can include a plurality of protruding ridges 24, 26. The ridges 24, 26 can extend along the rollers 12, 14 in a direction generally parallel to axes of rotation 16, 20. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIG. 1B. In alternative implementations, the tips of the ridges 24, 26 can have sharp angled corners. FIGS. 1A and 1B also illustrate that grooves 28, 30 can separate adjacent ridges 24, 26.

The ridges 24 on the first roller 12 can be offset or staggered with respect to the ridges 26 on the second roller 14. Thus, the grooves 28 of the first roller 12 can receive the ridges 26 of the second roller 14, as the rollers 12, 14 intermesh. Similarly, the grooves 30 of the second roller 14 can receive the ridges 24 of the first roller 12. In one or more implementations, the ridges 24, 26 will not contact each other or transmit rotational torque during an intermeshing stretching operation.

One will appreciate in light of the disclosure herein that the configuration of the ridges 24, 26 and grooves 28, 30 can prevent contact between ridges 24, 26 during intermeshing. Additionally, the configuration of the ridges 24, 26 and grooves 28, 30 can dictate the amount stretching a film passing through the MD intermeshing rollers 12, 14 undergoes.

Referring specifically to FIG. 1B, various features of the ridges 24, 26 and grooves 28, 30 are shown in greater detail. The pitch and depth of engagement of the ridges 24, 26 can determine, at least in part, the amount of incremental stretching created by the intermeshing rollers 12, 14. As shown by FIG. 1B, the pitch 32 is the distance between the tips of two adjacent ridges on the same roller. The "depth of engagement" (DOE) 34 is the amount of overlap between ridges 24, 26 of the different rollers 12, 14 during intermeshing. The ratio of DOE 34 to pitch 32 can determine, at least in part, the amount of stretch imparted by a pair of intermeshing rollers 12, 14.

As shown by FIG. 1A, the direction of travel of the film 10 through the intermeshing rollers 12, 14 is parallel to the machine direction and perpendicular to the transverse direction. As the thermoplastic film 10 passes between the intermeshing rollers 12, 14, the ridges 24, 26 can incrementally stretch the film 10 in the machine direction. In some implementations, stretching the film 10 in the machine direction can reduce the gauge of the film and increase the length of the film 10. In other implementations, the film 10 may rebound after stretched such that the gauge of the film 10 is not decreased. Furthermore, in some implementations, stretching the film 10 in the machine direction can reduce the width of the film 10. For example, as the film 10 is lengthened in the machine direction, the film's length can be reduced in the transverse direction.

In particular, as the film 10 proceeds between the intermeshing rollers 12, 14, the ridges 24 of the first roller 12 can push the film 10 into the grooves 30 of the second roller 14 and vice versa. The pulling of the film 10 by the ridges 24, 26 can stretch the film 10. The rollers 12, 14 may not stretch the film 10 evenly along its length. Specifically, the rollers 12, 14 can stretch the portions of the film 10 that contact the ridges 24, 26 more than the portions of the film 10 that do not contact the ridges 24, 26. Thus, the rollers 12, 14 can impart or form a striped pattern 36 into the film 10. As used herein, the terms "impart" and "form" refer to the creation of a desired structure or geometry in a film upon stretching the film that will at least partially retain the desired structure or geometry when the film is no longer subject to any strains or externally applied forces.

As shown in FIGS. 1A and 1B, the striped pattern 36 formed by the MD ring rolling process can be visually perceivable. As used herein, the term "visually perceivable" refers to features that are readily discernible to the normal naked eye. In particular, visually perceivable features can be readily discernible to the normal naked eye when a film 10 including the features is subjected to normal use.

In one or more implementations, prior to passing through the intermeshing rollers 12, 14, the film 10 may not include a visually perceivable striped pattern. For example, FIGS. 1A and 1B illustrate that the pre-stretched film 10a (i.e., the film that is yet to pass through the intermeshing rollers 12, 14) can have a substantially flat top surface 38 and substantially flat bottom surface 40. The pre-stretched film 10a can have an initial thickness or starting gauge 42 extending between its major surfaces (i.e., the top surface 38 and the bottom surface 40). In at least one implementation, the starting gauge 42 can be substantially uniform along the length of the pre-stretched film 10a.

For purposes of the present invention, the pre-stretched film 10a need not have an entirely flat top surface 38. Indeed, the top surface 38 can be rough or uneven. Similarly, bottom surface 40 of the pre-stretched film 10a can also be rough or uneven. Further, the starting gauge 42 need not be consistent or uniform throughout the entirety of pre-stretched film 10a. Thus, the starting gauge 42 can vary due to product design, manufacturing defects, tolerances, or other processing issues.

In any event, FIGS. 1A and 1B illustrate the intermeshing rollers 12, 14 can process the pre-stretched film 10a into an MD incrementally-stretched film 10b with visually-distinct stretched regions. As previously mentioned, the MD incrementally-stretched film 10b can include a striped pattern 36. The striped pattern 36 can include alternating series of "un-stretched" regions 44 and stretched regions 46. In one or more implementations, the "un-stretched" regions of the incrementally-stretched films may be stretched to a small degree. In any event, the "un-stretched" regions are stretched significantly less compared to the stretched regions.

The un-stretched regions 44 can have a first average thickness or gauge 48. The first average gauge 48 can be approximately equal to the starting gauge 42. In one or more implementations, the first average gauge 48 can be less than the starting gauge 42. The stretched regions 46 can have a second average thickness or gauge 50. In one or more implementations, the second average gauge 50 can be less than both the starting gauge 42 and the first average gauge 48.

One will appreciate in light of the disclosure herein that the striped pattern 36 may vary depending on the method used to incrementally stretch the film 10. To the extent that MD ring rolling is used to incrementally stretch the film 10, the striped pattern 36 on the film 10 can depend on the pitch 32 of the ridges 24, 26, the DOE 34, and other factors. In some implementations, the molecular structure of the thermoplastic material of the film 10 may be rearranged to provide this shape memory.

Figure 2:
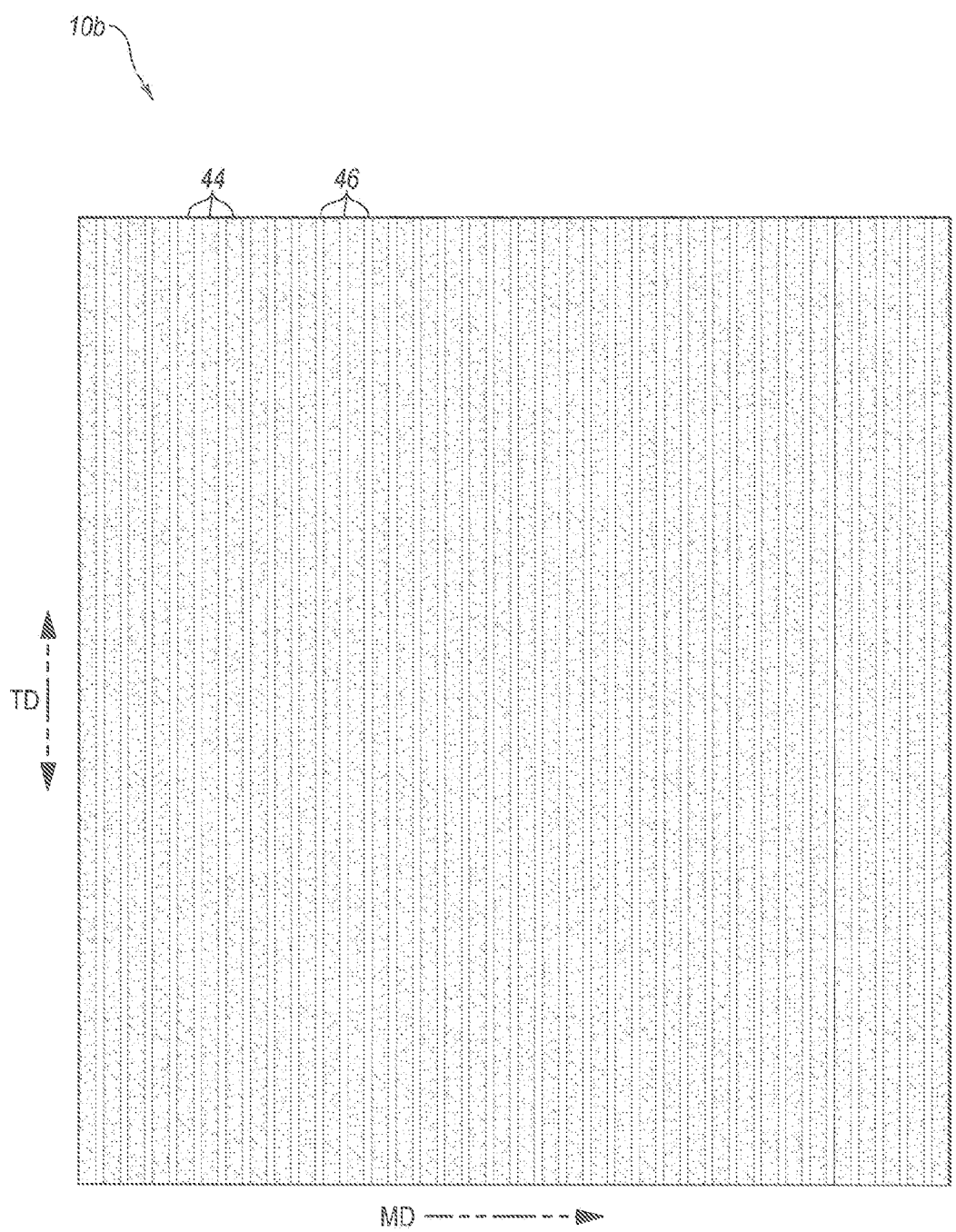
FIG. 2 illustrates a view of a thermoplastic film including visually-distinct stretched regions created by the intermeshing rollers of FIG. 1.

FIG. 2 illustrates a top view of the MD incrementally-stretched film 10b with visually-distinct stretched regions. As shown by FIG. 2, the stretched regions 46 can be white and opaque. The localized stretching of the film 10 in the stretched regions 46 can create voids that provide the stretched regions 46 with whiteness and opacity. In other words, the stretched regions can be stress-whitened. In one or more implementations, the stretched regions 46 are non porous, despite the presence of voids, as previously described herein above.

Additionally, in one or more implementations, despite having a reduced gauge, the stretched regions 46 can be white and opaque. The opacity of the stretched regions 46 can result in a pleasing appearance and connote strength to a consumer. Furthermore, the whiteness and opacity of the stretched regions 46 can signify that the film 10b has undergone a transformation to modify one or more characteristics of the film 10b. For example, MD ring rolling the film 10 can increase or otherwise modify one or more of the tensile strength, tear resistance, impact resistance, or elasticity of the film 10b. The visually-distinct stretched regions 46 can signify the transformation to a consumer.

Furthermore, the stretched regions 46 can include stripes that extend across the film 10b in a direction transverse (i.e., transverse direction) to a direction in which the film was extruded (i.e., machine direction). As shown by FIG. 2, the stripes or stretched regions 46 can extend across the entire length of the film 10b. The pitch 32 and the DOE 34 of the ridges 24, 26 of the intermeshing rollers 12, 14 can determine the width and spacing of the stripes or stretched regions 46. Thus, as explained in greater detail below, by varying the pitch 32 and/or DOE 34, the width and/or spacing of the stretched regions 46 can be varied.

FIG. 2 further illustrates that the stretched regions 46 can be intermittently dispersed about un-stretched regions 44. In particular, each stretched region 46 can reside between adjacent un-stretched regions 44. Additionally, the stretched regions 46 can be visually distinct from the un-stretched regions 44. For example, the stretched regions 46 can differ from the un-stretched regions 44 in one or more of color or transparency.

Thus, the un-stretched regions 44 can be a color other than white and/or transparent or translucent. For instance, the un-stretched regions 44 can be black, blue, red, another color, or any shade there between. Thus, in one or more implementations, the stretched regions 46 can be a lighter shade with increased opacity and the un-stretched regions 44 can be either (i) white and transparent or translucent, (ii) a color other than white and transparent or translucent, or (ii) a color other than white and opaque.

Furthermore, the opacity and color of the visually-distinct stretched regions 46 can vary based on the degree of stretching. For instance, when the un-stretched regions 44 are red, the stretched regions 46 can be a lighter shade of red, pink, or even white, along the spectrum of stretch. When the un-stretched regions 44 are black, the stretched regions 46 can be a lighter shade of black, grey, and even white, depending on the degree of stretch. Similar to the shade or color, the opacity of the stretched regions 46 can vary based on the degree of stretching.

Figure 3:
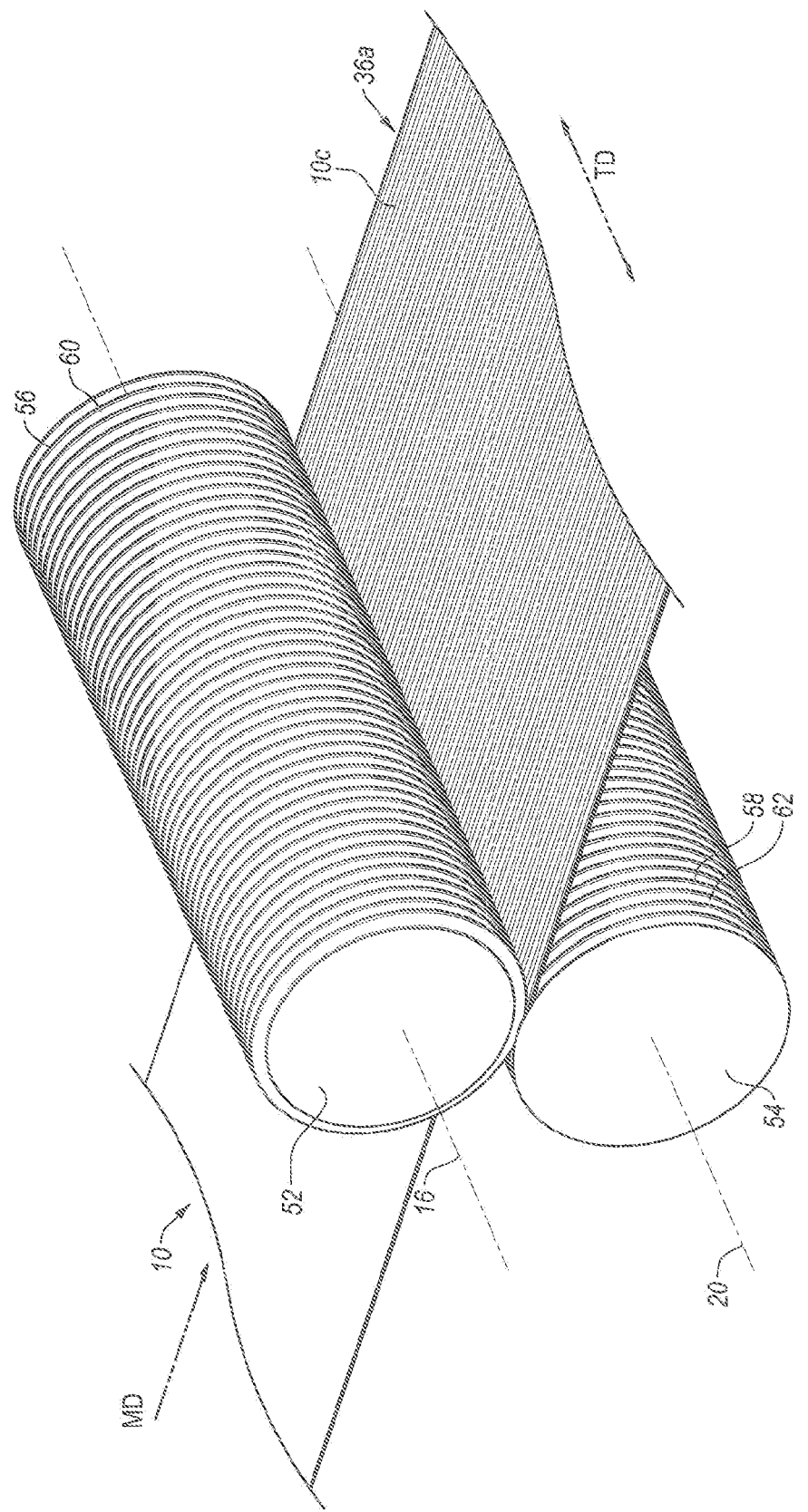
FIG. 3 illustrates a schematic diagram of a thermoplastic film being incrementally stretched by TD intermeshing rollers in accordance with one or more implementations of the present invention.

As mentioned previously, MD ring rolling is one exemplary method of incrementally stretching a thermoplastic film to create visually-distinct stretched regions in accordance with an implementation of the present invention. TD ring rolling is another suitable method of incrementally stretching a film to create visually-distinct stretched regions. For example, FIG. 3 illustrates a TD ring rolling process that incrementally stretches a thermoplastic film 10 by passing the film 10 through a pair of TD intermeshing rollers 52, 54. A TD ring rolling processes (and associated TD intermeshing rollers 52, 54) can be similar to the MD ring rolling process (and associated MD intermeshing rollers 12, 14) described herein above, albeit that the ridges 56, 58 and grooves 60, 62 of the TD intermeshing rollers 52, 54 can extend generally orthogonally to the axes of rotation 16, 20.

Thus, as shown by FIG. 3, as the thermoplastic film 10 passes between the intermeshing rollers 52, 54, the ridges 56, 58 can incrementally stretch the film 10 in the transverse direction. In particular, as the film 10 proceeds between the intermeshing rollers 52, 54, the ridges 56, 58 can impart or form a striped pattern 36a into the film 10 to form a TD incrementally-stretched film 10c with visually-distinct stretched regions.

Figure 4:
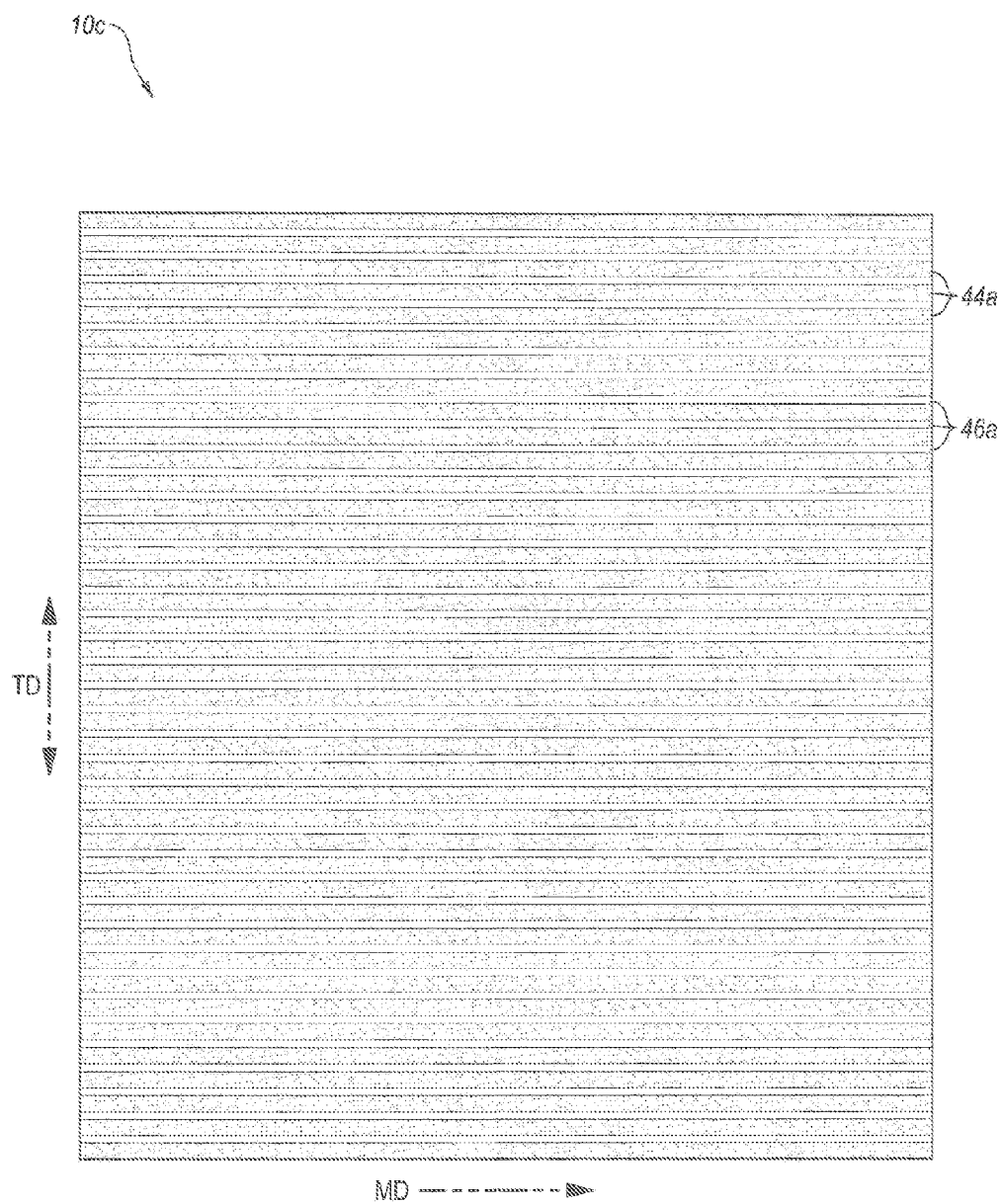
FIG. 4 illustrates a view of a thermoplastic film including visually-distinct stretched regions created by the intermeshing rollers of FIG. 3.

FIG. 4 illustrates a view of the TD incrementally-stretched film 10c with visually-distinct stretched regions. The striped pattern 36a can include alternating series of un-stretched regions 44a and stretched regions 46a. As shown by FIG. 4, the stretched regions 46a can be white and opaque. The localized stretching of the film 10 in the stretched regions 46a can create voids that provide the stretched regions 46a with whiteness and opacity. In one or more implementations, the stretched regions 46a are non porous, despite the presence of voids, as previously described herein above.

The opacity of the stretched regions 46a can result in a pleasing appearance and connote strength to a consumer. Furthermore, the whiteness and opacity of the stretched regions 46a can signify that the film 10c has undergone a transformation to modify one or more characteristics of the film 10c. For example, TD ring rolling the film 10 can increase or otherwise modify one or more of the tensile strength, tear resistance, impact resistance, or elasticity of the film 10c. The visually-distinct stretched regions 46a can signify the transformation to a consumer.

FIG. 4 illustrates that the stretched regions 46a can include stripes that extend across the film 10c in the machine direction. As shown by FIG. 4, the stripes or stretched regions 46a can extend across the entire width of the film 10c. In alternative implementations, stretched regions 46a can extend across only a portion of the film 10c. Similar to MD ring rolling, the pitch and the DOE of the ridges 56, 58 of the intermeshing rollers 52, 54 can determine the width and spacing of the stripes or stretched regions 46a.

Figure 5:
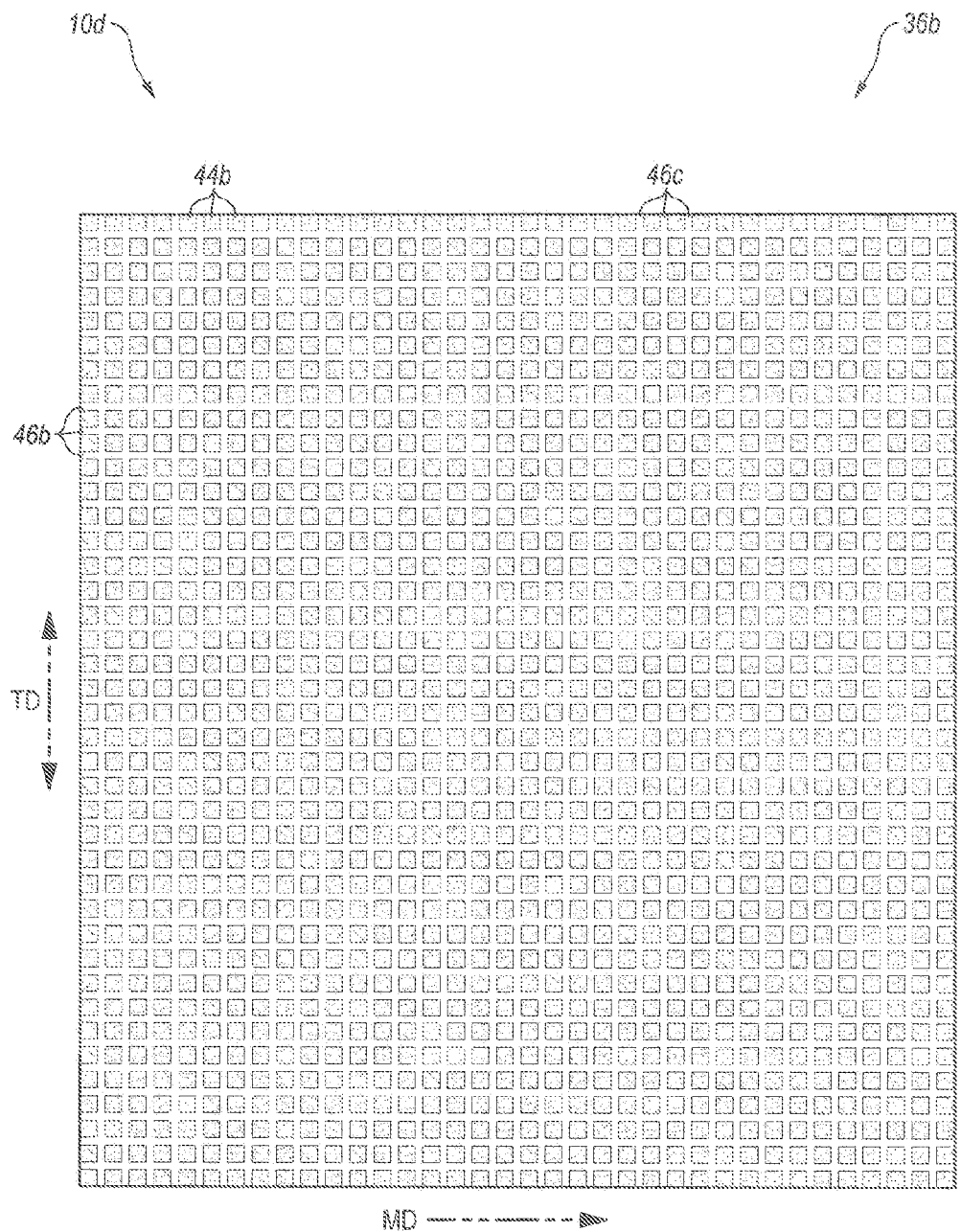
FIG. 5 illustrates a view of a thermoplastic film including visually-distinct stretched regions created by the intermeshing rollers of both FIG. 1 and FIG. 3.

In still further implementations, a film 10 can undergo both an MD ring rolling process and a TD ring rolling process to create visually-distinct stretched regions. For example, FIG. 5 illustrates a top view of an incrementally-stretched film 10d with visually-distinct stretched regions created by MD and TD ring rolling. The incrementally-stretched film 10d can have a checker board pattern 36b. The checker board pattern 36b can include alternating series of un-stretched regions 44b and stretched regions 46b, 46c. As shown by FIG. 5, stretched regions 46b, 46c can be visually distinct from the un-stretched regions 44b. In particular, stretched regions 46b, 46c can be white and opaque. The stretched regions 46b, 46c can include stripes 46b that extend along the film 10c in the machine direction, and stripes 46c that extend along the film in the transverse direction. As shown by FIG. 5, in one or more implementations, the aspect ratio of the rows and columns of the stretched regions 46b, 46c can be approximately 1 to 1. In alternative implementations, the aspect ratio of the rows and columns of the rows and columns of the stretched regions 46b, 46c can be greater or less than 1 to 1, as explained in greater detail in relation to FIG. 11.

The incrementally-stretched film 10d with visually-distinct stretched regions created by MD and TD ring rolling can allow for even greater material savings by further increasing the surface area of a given portion of film. Additionally, MD and TD ring rolling can provide properties or advantages not obtained by MD or TD ring rolling alone. Thus, checker board pattern 36b created by the stretched regions 46b, 46c can signify these transformations to a consumer.

Figure 6:
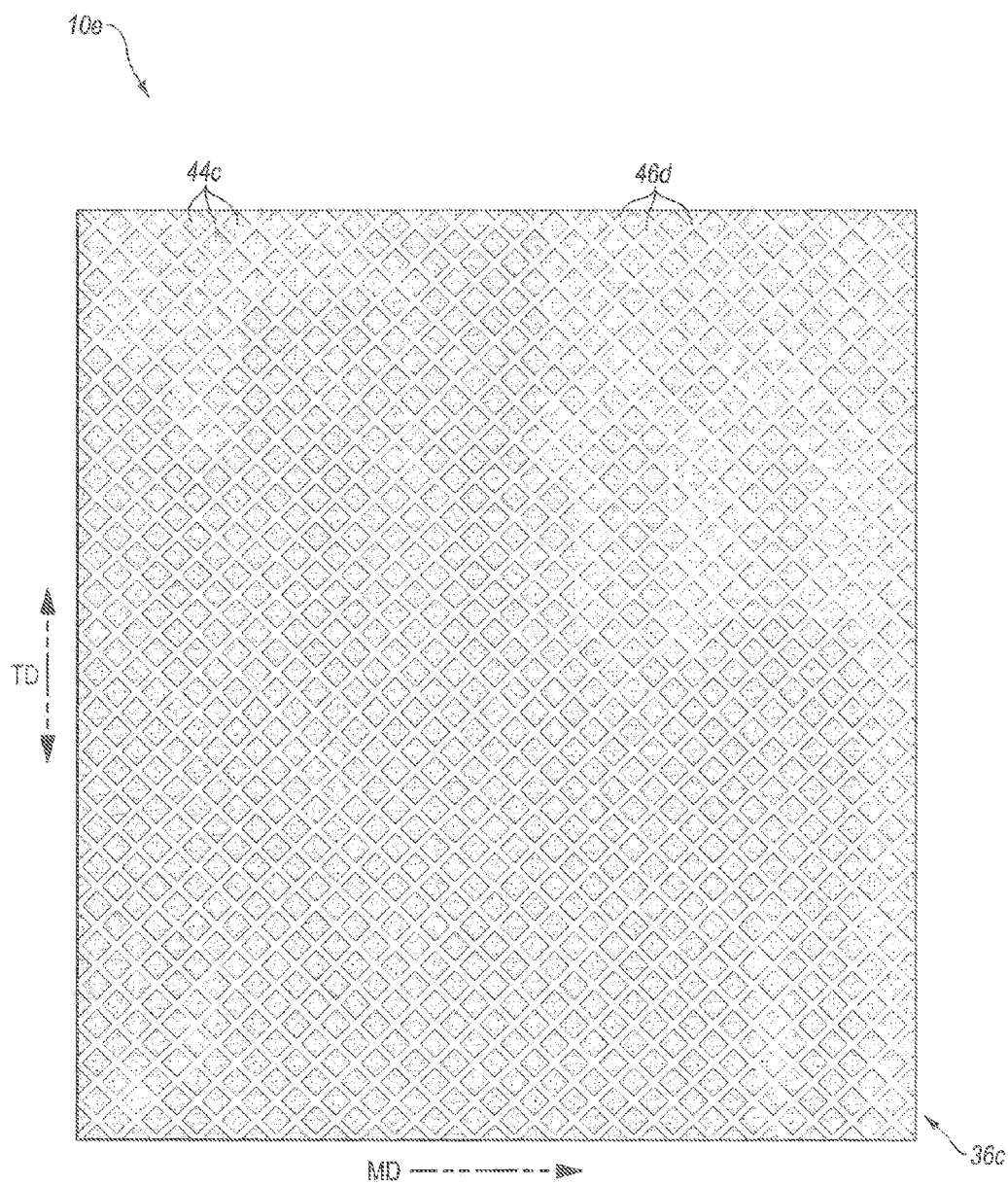
FIG. 6 illustrates a view of thermoplastic film including visually-distinct stretched regions created by diagonal direction intermeshing rollers in accordance with one or more implementations of the present invention.

In yet further implementations, a manufacturer can use DD ring rolling to incrementally stretch a thermoplastic film to create visually-distinct stretched regions. A DD ring rolling processes (and associated DD intermeshing rollers) can be similar to the MD ring rolling process (and associated MD intermeshing rollers 12, 14) described herein above, albeit that the ridges and grooves of the DD intermeshing rollers can extend at an angle relative to the axes of rotation. For example, FIG. 6 illustrates a view of an incrementally-stretched film 10e with visually-distinct stretched regions created by DD ring rolling. The incrementally-stretched film 10e can have a diamond pattern 36c. The diamond pattern 36c can include alternating series of diamond-shaped un-stretched regions 44c and stretched regions 46d. As shown by FIG. 6, stretched regions 46d can be visually distinct. The stretched regions can include stripes 46d oriented at an angle relative to the transverse direction such that the stripes 46d are neither parallel to the transverse or machine direction.

One will appreciate in light of the disclosure herein that one or more implementations can include stretched regions arranged in other patterns/shapes. Such additional patterns include, but are not limited to, intermeshing circles, squares, diamonds, hexagons, or other polygons and shapes. Additionally, one or more implementations can include stretched regions arranged in patterns that are combinations of the illustrated and described patterns/shapes.

In accordance with another implementation, a structural elastic like film (SELF) process may be used to create a thermoplastic film with strainable networks. As explained in greater detail below, the strainable networks can include visually-distinct stretched regions. U.S. Pat. Nos. 5,518,801; 6,139,185; 6,150,647; 6,394,651; 6,394,652; 6,513,975; 6,695,476; U.S. Patent Application Publication No. 2004/0134923; and U.S. Patent Application Publication No. 2006/0093766 each disclose processes to form strainable networks or patterns of strainable networks suitable for use with implementations of the present invention. The contents of each of the aforementioned patents and patent application publications are incorporated in their entirety by reference herein.

Figure 7:
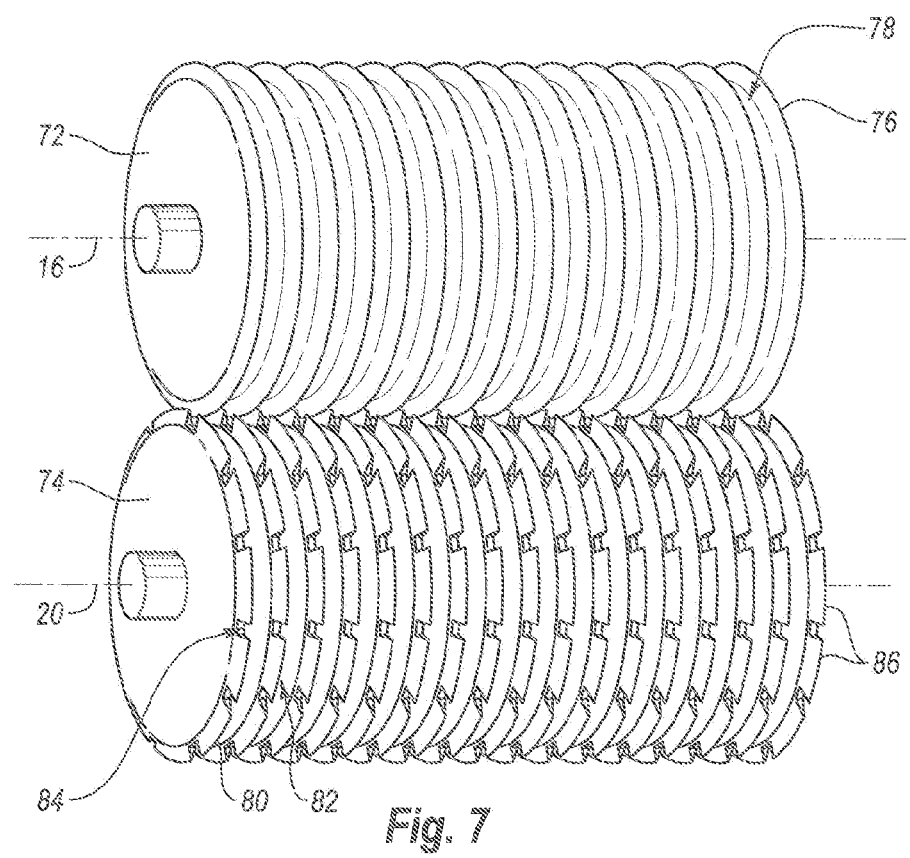
FIG. 7 illustrates a schematic diagram of a set of intermeshing rollers used to impart strainable networks into a film in accordance with one or more implementations of the present invention.

FIG. 7 illustrates a pair of SELF'ing intermeshing rollers 72, 74 for creating strainable networks with visually-distinct stretched regions in a film. The first SELF'ing intermeshing roller 72 can include a plurality of ridges 76 and grooves 78 extending generally radially outward in a direction orthogonal to an axis of rotation 16. Thus, the first SELF'ing intermeshing roller 72 can be similar to a TD intermeshing roller 52, 54. The second SELF'ing intermeshing roller 74 can include also include a plurality of ridges 80 and grooves 82 extending generally radially outward in a direction orthogonal to an axis of rotation 20. As shown by FIG. 7; however, the ridges 80 of the second SELF'ing intermeshing roller 74 can include a plurality of notches 84 that define a plurality of spaced teeth 86.

Figure 8:
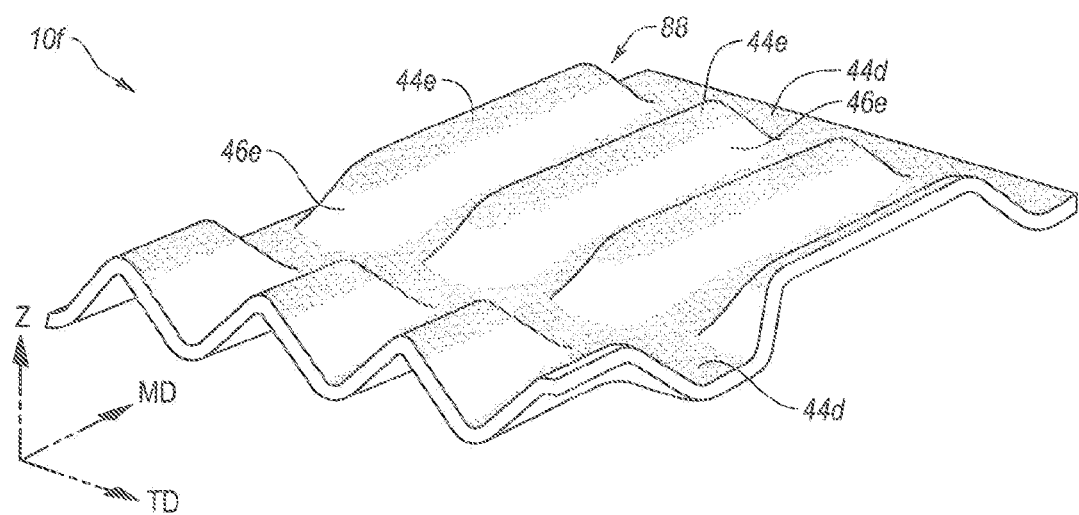
FIG. 8 illustrates a view of a thermoplastic film including visually-distinct stretched regions created by the intermeshing rollers of FIG. 7.

Referring now to FIG. 8, an incrementally-stretched film 10f with visually-distinct stretched regions created using the SELF'ing intermeshing rollers 72, 74 is shown. In particular, as the film passes through the SELF'ing intermeshing rollers 72, 74, the teeth 86 can press a portion of the web out of plane to cause permanent, deformation of a portion of the film in the Z-direction. On the other hand the portions of the film that pass between the notched regions 84 and the teeth 86 will be substantially unformed in the Z-direction, resulting in a plurality of deformed, raised, rib-like elements 88.

As shown by FIG. 8, the strainable network of the incrementally-stretched film 10f with visually-distinct stretched regions can include first un-stretched regions 44d, second un-stretched regions 44e, and stretched transitional regions 46e connecting the first and second un-stretched regions 44d, 44e. The second un-stretched regions 44e and the stretched regions 46e can form the raised rib-like elements 88 of the strainable network.

FIG. 8 illustrates that the stretched regions 46e can be visually distinct from the un-stretched regions 44d, 44e. In particular, stretched regions 46e can be white and opaque. The stretched regions 46e can be discontinuous or be separated as they extend across the film 10f in both transverse and machine directions. This is in contrast to stripes that extend continuously across a film in one of the machine and transverse directions.

The rib-like elements 88 can allow the film 10f to undergo a substantially "geometric deformation" prior to a "molecular-level deformation." As used herein, the term "molecular-level deformation" refers to deformation which occurs on a molecular level and is not discernible to the normal naked eye. That is, even though one may be able to discern the effect of molecular-level deformation, e.g., elongation of the film, one is not able to discern the deformation which allows or causes it to happen. This is in contrast to the term "geometric deformation." As used herein, the term "geometric deformation" refers to deformations of the film 10f which are generally discernible to the normal naked eye when the film 10f or articles embodying the film 10f are subjected to an applied strain. Types of geometric deformation include, but are not limited to bending, unfolding, and rotating.

Thus, upon an applied strain, the rib-like elements 88 can undergo geometric deformation before either the rib-like elements 88 or the flat regions undergo molecular-level deformation. For example, an applied strain can pull the rib-like elements 88 back into plane with the flat regions prior to any molecular-level deformation of the film 10f. Geometric deformation can result in significantly less resistive forces to an applied strain than that exhibited by molecular-level deformation.

Thus, the strainable network of the film 10f may provide improved properties to the film 10f, such as elasticity, improved tear, and improved impact properties. The visually-distinct stretched regions 46e can provide notice to a consumer that the film 10f includes the improved properties provided by the strainable network. Additionally, the opacity of the visually-distinct stretched regions 46e can provide a look or feel of increased thickness and strength.

Figure 9:
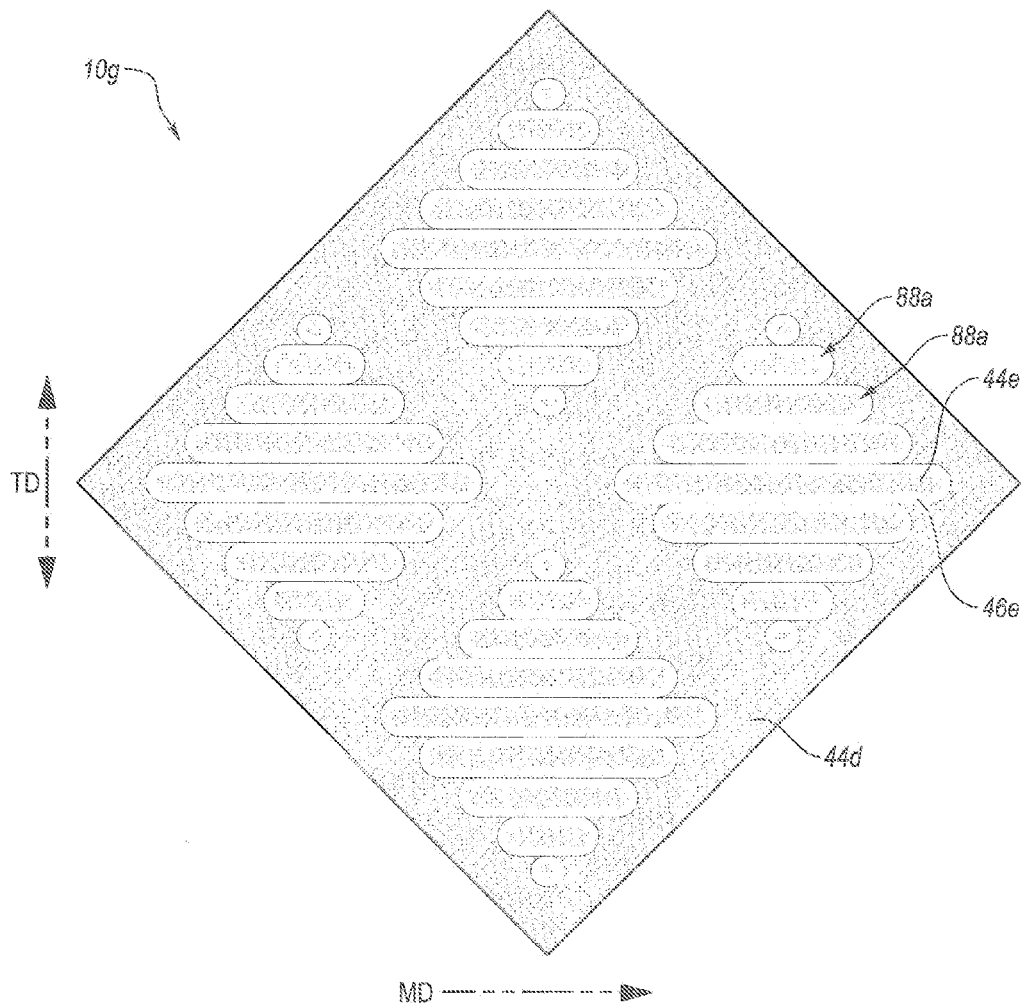
FIG. 9 illustrates a view of a thermoplastic film including strainable networks having visually-distinct stretched regions in accordance with one or more implementations of the present invention.

One will appreciate in light of the disclosure herein that the pattern of the strainable network of FIG. 8 is only one pattern suitable for use with the present invention. For example, FIG. 9 illustrates another strainable network pattern that can include visually-distinct stretched regions. In particular, FIG. 9 illustrates an incrementally-stretched film 10g with a strainable network of rib-like elements 88a arranged in diamond patterns. The strainable network of the incrementally-stretched film 10g with visually-distinct stretched regions can include first un-stretched regions 44d, second un-stretched regions 44e, and stretched transitional regions 46e connecting the first and second un-stretched regions 44d, 44e. The stretched regions 46e can be visually distinct from the unstretched regions 44d, 44e. In particular, stretched regions 46e can be white and opaque.

One or more implementations of the present invention can include strainable network patterns other than those shown by FIGS. 8 and 9, or combinations of various patterns. It should be understood that the term "pattern" is intended to include continuous or discontinuous sections of patterns, such as may result, for example, from the intersection of first and second patterns with each other. Furthermore, the patterns can be aligned in columns and rows aligned in the machine direction, the transverse direction, or neither the machine or transverse directions.

One will appreciate in light of the disclosure herein that the incrementally-stretched films with visually-distinct stretched regions can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include incrementally-stretched with visually-distinct stretched regions to one extent or another. Trash bags and food storage bags may be particularly benefited by the films of the present invention.

Figure 10:
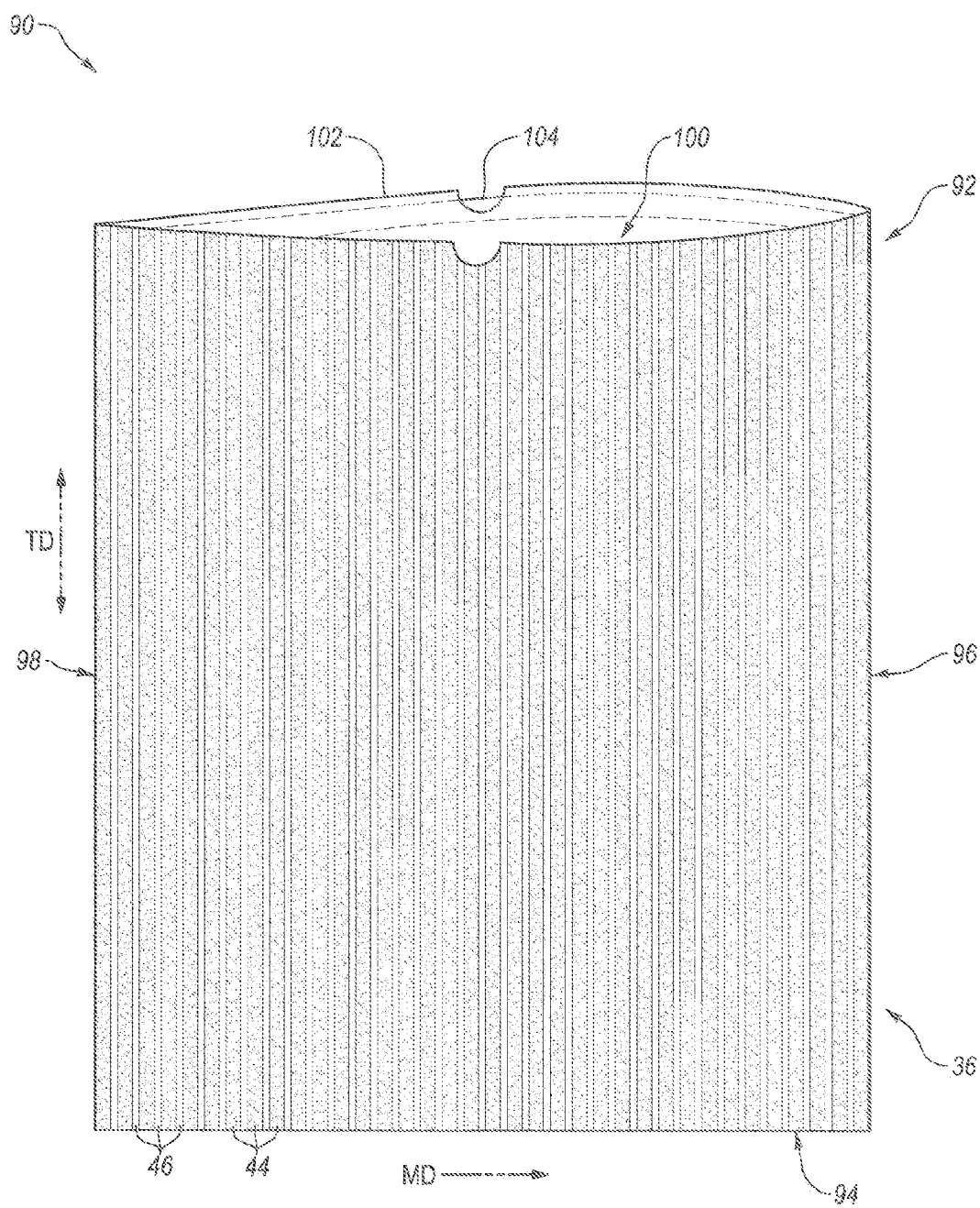
FIG. 10 illustrates a bag incorporating the film of FIG. 2.

Referring to FIG. 10, in a particular implementation of the present invention, the incrementally-stretched film 10b illustrated in FIG. 2 may be incorporated in a bag construction, such as a flexible draw tape bag. The bag 90 can include a bag body 92 formed from a piece of incrementally-stretched film 10b folded upon itself along a bag bottom 94. Side seams 96 and 98 can bond the sides of the bag body 92 together to form a semi-enclosed container having an opening 100 along an upper edge 102. The bag 90 also optionally includes closure means 104 located adjacent to the upper edge 102 for sealing the top of the bag 90 to form a fully-enclosed container or vessel. The bag 90 is suitable for containing and protecting a wide variety of materials and/or objects. The closure means 104 can comprise flaps, adhesive tapes, a tuck and fold closure, an interlocking closure, a slider closure, a zipper closure or other closure structures known to those skilled in the art for closing a bag.

As shown, the sides of the bag body 92 can include unstretched regions 44 and stretched regions 46 in the form of stripes. The stretched regions 46 can be visually distinct from the un-stretched regions 44. In particular, the stretched regions 46 can be white and opaque. The stripes can extend across the bag 90 in the TD direction, or in other words, from the bag bottom 94 to the upper edge 102. The bag 90 can require less material to form than an identical bag formed with an un-stretched film 10a of the same thermoplastic material. Additionally, despite requiring less material, the bag 90 can include improved properties imparted by MD ring rolling. The visually-distinct stretched regions 46 can serve to notify a consumer of the improved properties. Furthermore, while the bag body 92 can include opaque regions created by voiding agents, the bag body 92 can be non porous. Thus, the bag body 92 can prevent liquids, and at least substantially prevent gases, from passing there through.

Figure 11:
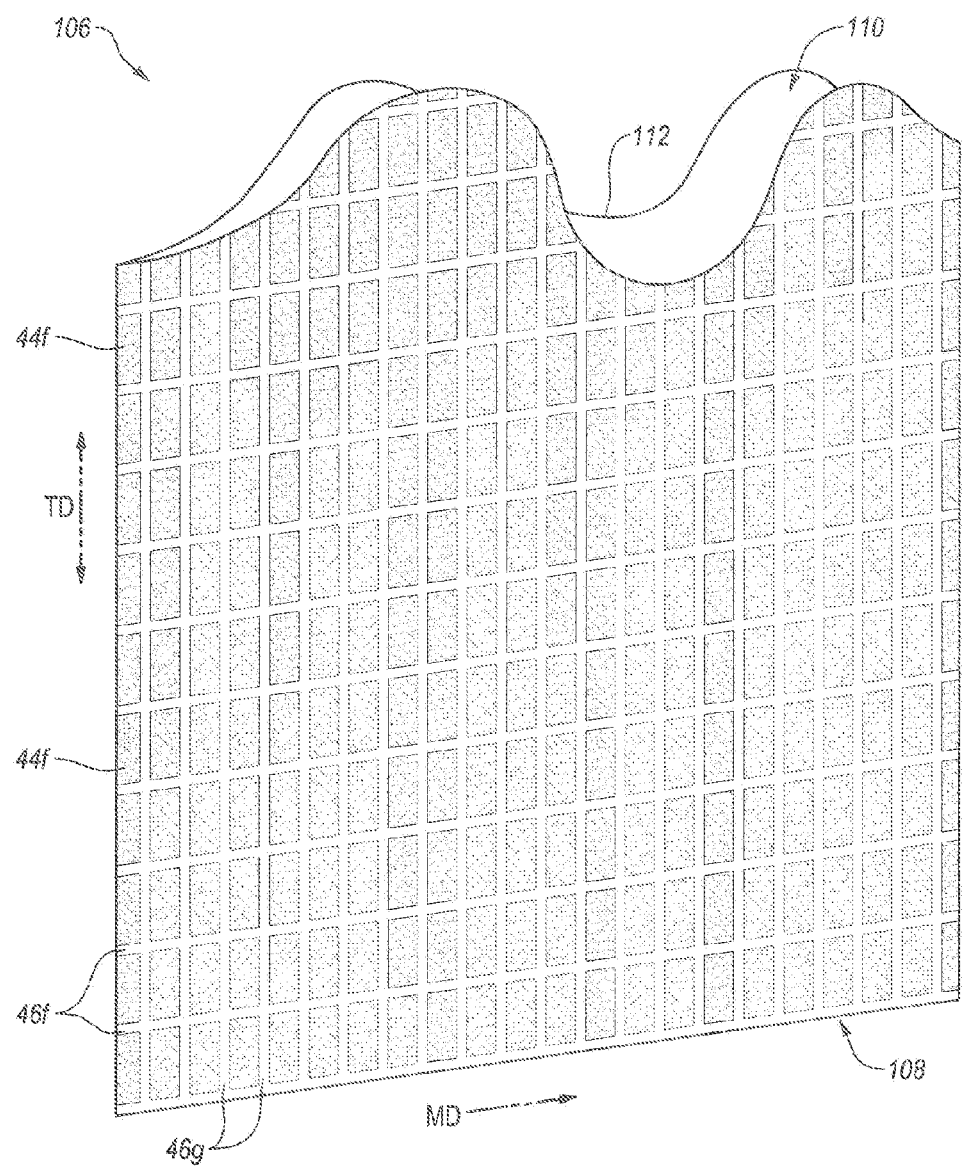
FIG. 11 illustrates a bag incorporating a film having visually-distinct stretched regions in accordance with one or more implementations of the present invention.

FIG. 11 illustrates a tie bag 106 incorporating an incrementally-stretched film with visually-distinct stretched regions in accordance with an implementation of the present invention. As shown the sides of the tie bag 106 can include a pattern of un-stretched regions 44f and stretched regions 46f, 46g created by MD and TD ring rolling. The stretched regions 46f, 46g can be visually distinct from the un-stretched regions 44f. In particular, stretched regions 46f, 46g can be white and opaque.

The visually-distinct stretched regions can include stripes 46f that extend across the bag 106 in the machine direction. Additionally, visually-distinct stretched regions can include stripes 46g that extend across the bag 106 in the transverse direction, or in other words from the bag bottom 108 to flaps 110 of an upper edge 112 of the bag 106.

In comparison with the film 10d of FIG. 5, the spacing between the MD extending stripes 46f is greater in the bag 106. This effect is created by using MD ring rolls having a greater pitch between ridges. Similarly, the spacing of the TD extending stripes 46g is greater in the bag 106 than the film 10d. This effect is created by using TD ring rolls having a greater pitch between ridges. Furthermore, the relative spacing between the MD extending stripes and the TD extending stripes differs in the bag 106, while relative spacing is the same in the film 10d. This effect is created by using TD ring rolls having a greater pitch between ridges compared to the pitch between ridges of the MD ring rolls. One will appreciate in light of the disclosure herein that the use of intermeshing rollers with greater or varied ridge pitch can provide the different spacing and thicknesses of the stripes. Thus, one will appreciate in light of the disclosure herein that a manufacturer can vary the ridge pitch of the intermeshing rollers to vary the pattern of the visually-distinct stretched regions, and thus, the aesthetic and/or properties of the bag or film.

Figure 12:
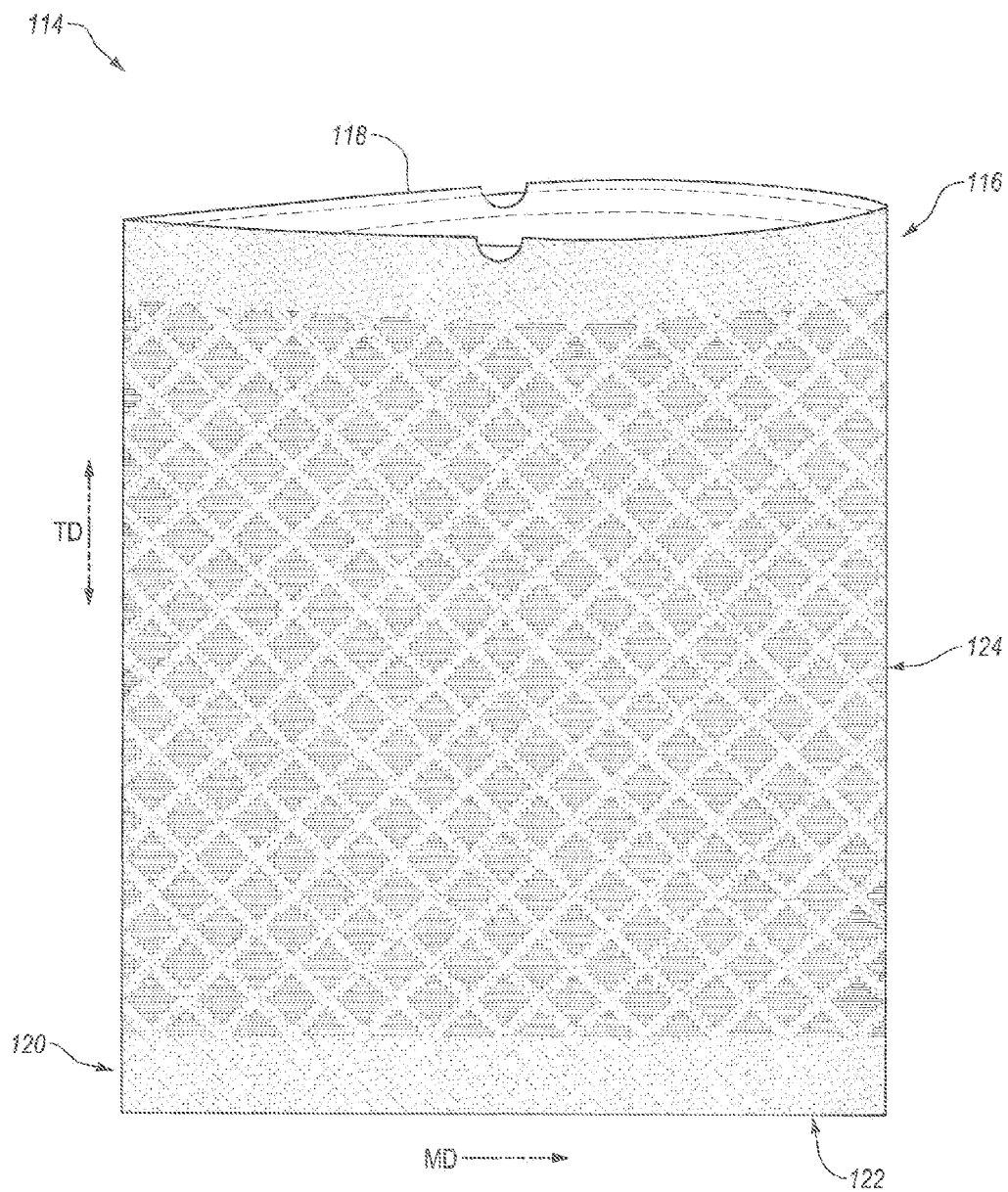
FIG. 12 illustrates a bag incorporating a middle section having visually-distinct stretched regions in accordance with one or more implementations of the present invention.

In addition to the varying the pattern of visually-distinct stretched regions in a bag or film, one or more implementations also include providing visually-distinct stretched regions in certain sections of a bag or film, and only unstretched regions in other sections of the bag or film. For example, FIG. 12 illustrates a bag 114 having an upper section 116 adjacent a top edge 118 that is devoid of visually-distinct stretched regions. Similarly, the bag 114 includes a bottom section 120 adjacent a bottom fold or edge 122 devoid of visually-distinct stretched regions. In other words, both the top section 116 and bottom section 120 of the bag 114 can each comprise un-stretched regions.

A middle section 124 of the bag 114 between the upper and lower sections 116, 120 on the other hand can include visually-distinct stretched regions. In particular, FIG. 12 illustrates that the middle section can include a strainable network of rib-like elements arranged in diamond patterns similar to the film 10e of FIG. 9. Thus, the middle section 124 of the bag 114 can include improved properties, such as elasticity and impact resistance, created by the strainable network. Furthermore, the white and opaque stretched regions (i.e., the stretched transitional regions of the rib-like elements) can serve to notify a consumer of that the middle section 124 includes improved properties.

Figure 13:
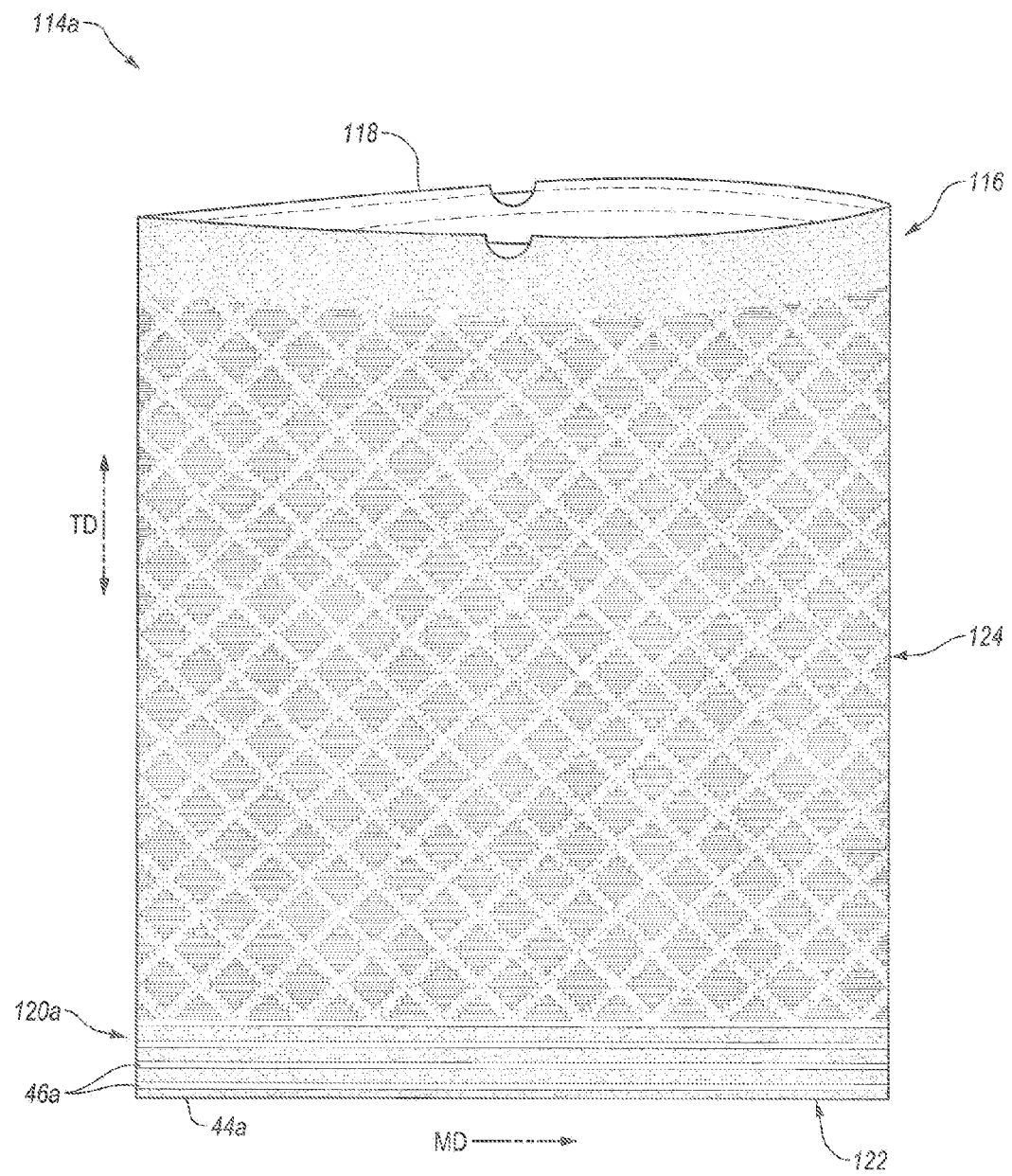
FIG. 13 illustrates a bag incorporating sections of different patterns of visually-distinct stretched regions in accordance with one or more implementations of the present invention.

In one or more additional implementations, the present invention includes providing different visually-distinct stretched regions in different sections of a bag or film. For example, FIG. 13 illustrates a bag 114a similar to the bag 114 of FIG. 12, albeit that the bottom section 120a includes alternating series of un-stretched regions 44a and stretched regions 46a created by TD ring rolling. Thus, the middle section 124 of the bag 114 can include one set of improved properties created by the strainable network, and the bottom section 120a can include another set of improved properties created by TD ring rolling. Furthermore, the white and opaque stretched regions can serve to notify a consumer of the different properties of the middle section 124 and the bottom section 120a.

Figure 14:
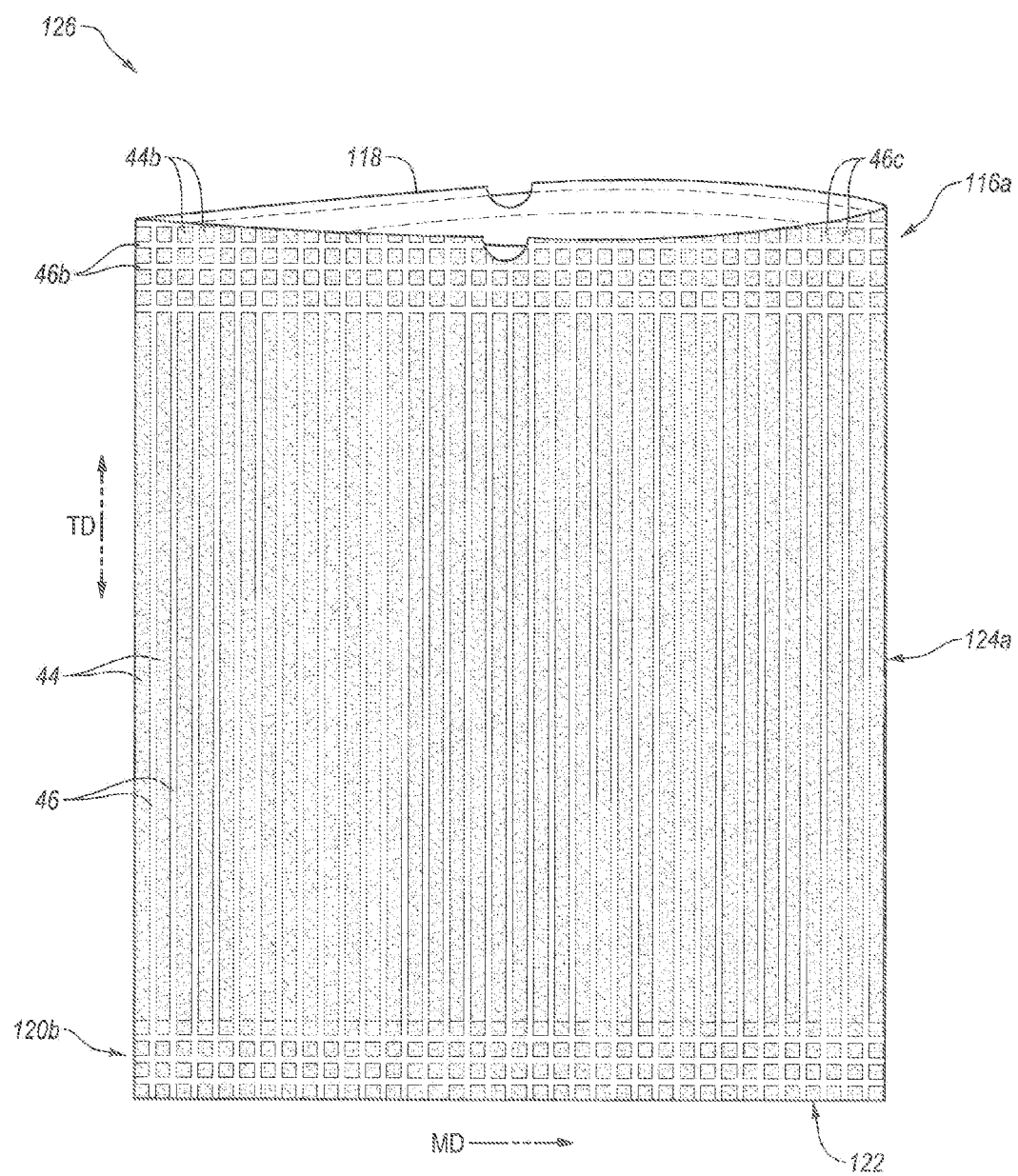
FIG. 14 illustrates another bag incorporating sections of different patterns of visually-distinct stretched regions in accordance with one or more implementations of the present invention.

FIG. 14 illustrates yet another bag 126 including having an upper section 116a adjacent a top edge 118 that includes alternating series of un-stretched regions 44b and visually-distinct stretched regions 46b, 46c created by MD and TD ring rolling similar to the film 10d of FIG. 5. Furthermore, the middle section 124a of the bag 126 can include un-stretched regions 44 and stretched regions 46 in the form of stripes created by MD ring rolling. The stretched regions 46 can be visually distinct from the un-stretched regions 44. In particular, stretched regions 46 can be white and opaque.

Thus, one will appreciate in light of the disclosure herein that a manufacturer can tailor specific sections or zones of a bag or film with desirable properties by MD, TD, or DD ring rolling, SELF'ing, or a combination thereof. Furthermore, the different visually-distinct stretched regions can serve to notify a consumer of the properties of the different sections. One will appreciate in light of the disclosure herein that the visually-distinct stretched regions can be more visually discernable than any geometric deformation alone.

Figure 15:
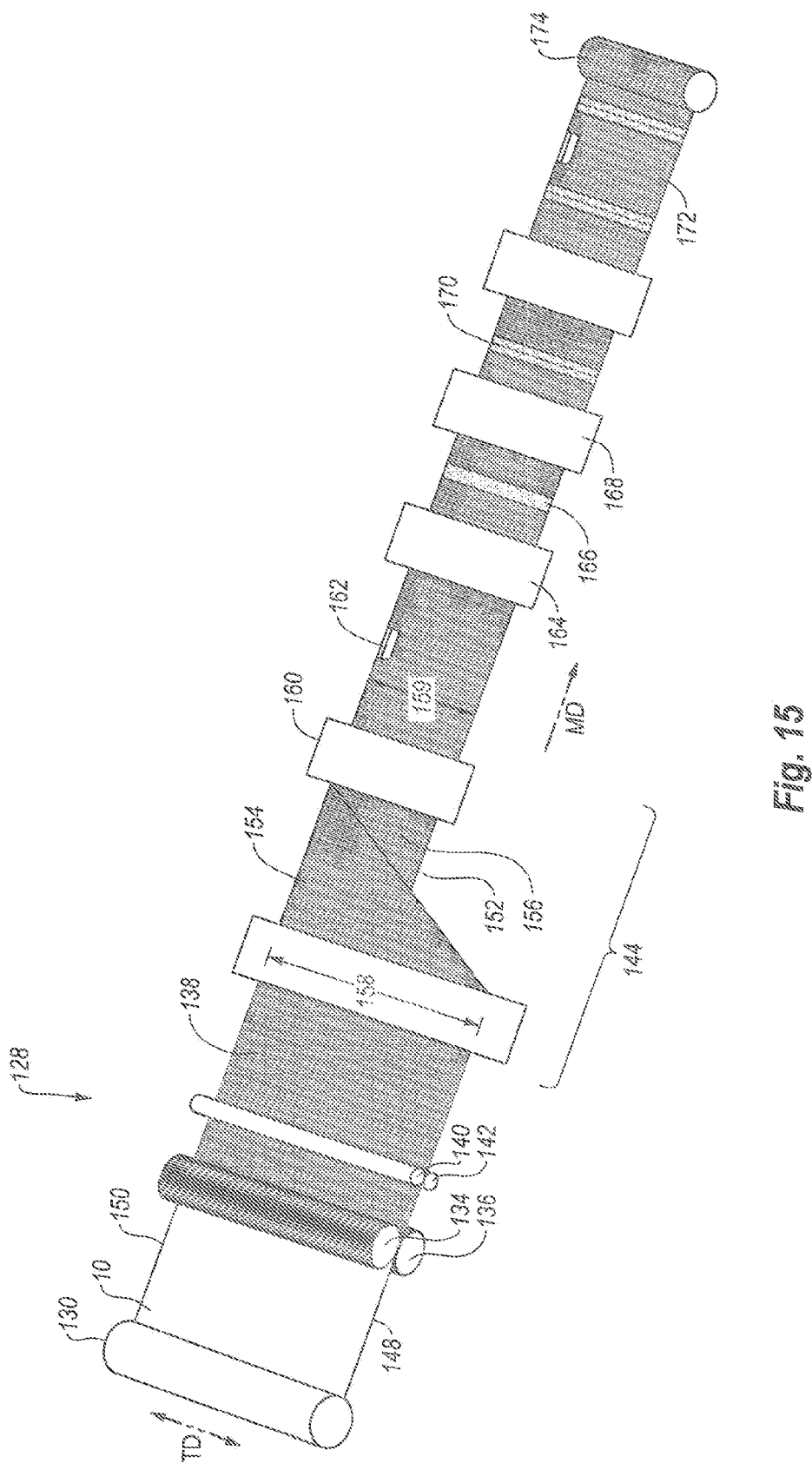
FIG. 15 illustrates a schematic diagram of a bag manufacturing process in accordance with one or more implementations of the present invention.

FIG. 15 illustrates an exemplary embodiment of a high-speed manufacturing process 128 for incrementally stretching a thermoplastic film to produce visually-distinct stretched regions and produce a plastic bag there from. According to the process 128, an un-stretched thermoplastic film 10 including a thermoplastic material and a voiding agent is unwound from a roll 130 and directed along a machine direction.

The un-stretched film 10 can pass between first and second cylindrical intermeshing rollers 134, 136 to incrementally stretch the un-stretched film 10 to create un-stretched regions and visually-distinct stretched regions in at least one section of the film. The intermeshing rollers 134, 136 can have a construction similar to that of intermeshing rollers 12, 14 of FIGS. 1A-1B, or any of the other intermeshing rollers shown or described herein. The rollers 134, 136 may be arranged so that their longitudinal axes are perpendicular to the machine direction. Additionally, the rollers 134, 136 may rotate about their longitudinal axes in opposite rotational directions. In various embodiments, motors may be provided that power rotation of the rollers 134, 136 in a controlled manner. As the un-stretched film 10 passes between the first and second rollers 134, 136, the ridges and/or teeth of the intermeshing rollers 134, 136 can form an incrementally-stretched film 138 with visually-distinct stretched regions.

During the manufacturing process 128, the incrementally-stretched film 138 can also pass through a pair of pinch rollers 140, 142. The pinch rollers 140, 142 can be appropriately arranged to grasp the incrementally-stretched film 138 with visually-distinct stretched regions. The pinch rollers 140, 142 may facilitate and accommodate the incrementally-stretched film 138 with visually-distinct stretched regions.

A folding operation 144 can fold the incrementally-stretched film 138 with visually-distinct stretched regions to produce the sidewalls of the finished bag. The folding operation 144 can fold the incrementally-stretched film 138 with visually-distinct stretched regions in half along the transverse direction. In particular, the folding operation 144 can move a first edge 148 adjacent to the second edge 150, thereby creating a folded edge 152. The folding operation 144 thereby provides a first film half 154 and an adjacent second web half 156. The overall width 158 of the second film half 156 can be half the width 158 of the pre-folded incrementally-stretched film 138 with visually-distinct stretched regions.

To produce the finished bag, the processing equipment may further process the folded incrementally-stretched film 138 with visually-distinct stretched regions. In particular, a draw tape operation 160 can insert a draw tape 162 into the incrementally-stretched film 138 with visually-distinct stretched regions. Furthermore, a sealing operation 164 can form the parallel side edges of the finished bag by forming heat seals 166 between adjacent portions of the folded incrementally-stretched film 138 with visually-distinct stretched regions. The heat seals 166 may be spaced apart along the folded incrementally-stretched film 138 with visually-distinct stretched regions. The sealing operation 164 can form the heat seals 166 using a heating device, such as, a heated knife.

A perforating operation 168 may form a perforation 170 in the heat seals 166 using a perforating device, such as, a perforating knife. The perforations 170 in conjunction with the folded outer edge 152 can define individual bags 172 that may be separated from the incrementally-stretched film 138. A roll 174 can wind the incrementally-stretched film 138 with visually-distinct stretched regions embodying the finished bags 172 for packaging and distribution. For example, the roll 174 may be placed into a box or bag for sale to a customer.

In still further implementations, the folded incrementally-stretched film 138 may be cut into individual bags along the heat seals 166 by a cutting operation. In another implementation, the folded incrementally-stretched film 138 with visually-distinct stretched regions may be folded one or more times prior to the cutting operation. In yet another implementation, the side sealing operation 164 may be combined with the cutting and/or perforation operations 168.

Figure 16:
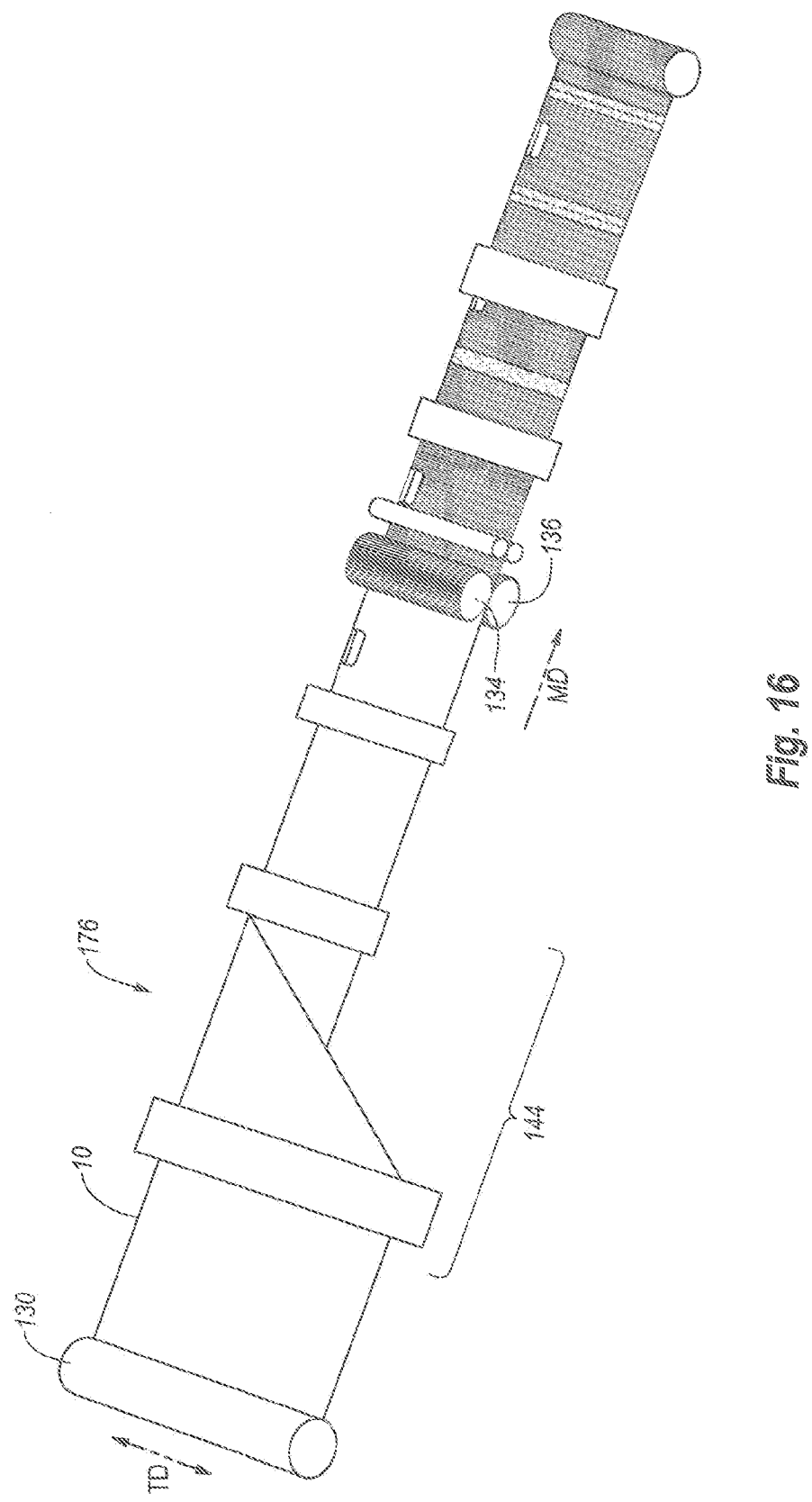
FIG. 16 illustrates a schematic diagram of another bag manufacturing process in accordance with one or more implementations of the present invention.

One will appreciate in light of the disclosure herein that the process 128 described in relation to FIG. 15 can be modified to omit or expanded acts, or vary the order of the various acts as desired. For example, FIG. 16 illustrates another manufacturing process 176 for producing a plastic bag having visually-distinct stretched regions imparted therein. The process 176 can be similar to process 128 of FIG. 15, except that the un-stretched film 10 is stretched by intermeshing rollers 134, 136 after the folding operation 144 has folded the un-stretched film 10 in half.

Figure 17:
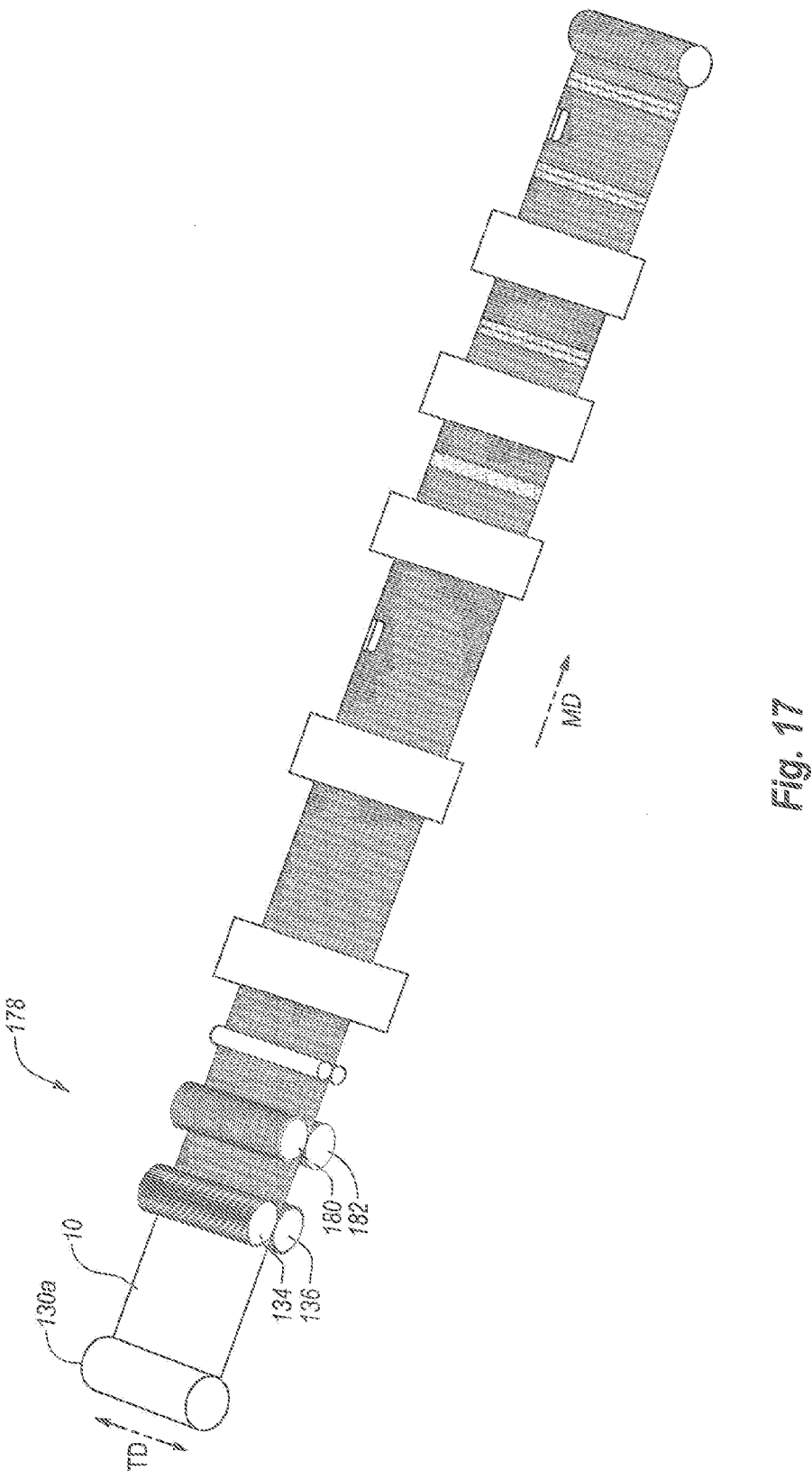
FIG. 17 illustrates a schematic diagram of yet another bag manufacturing process in accordance with one or more implementations of the present invention.

FIG. 17 illustrates yet another manufacturing process 178 for producing a plastic bag having visually-distinct stretched regions imparted therein. The process 178 can be similar to process 128 of FIG. 15, except that the un-stretched film 10 is folded prior to winding it on the roll 130a. Thus, in such implementations, the un-stretched film 10 unwound from the roll 130a is already folded. Additionally, the manufacturing process 178 illustrates that after passing through intermeshing rollers 134, 136, the film can pass through another set of intermeshing rollers 180, 182 to impart a second pattern of visually-distinct stretched regions to one or more sections of the film. The intermeshing rollers 180, 182 can have a construction similar to that of intermeshing rollers 52, 54 of FIG. 3, or any of the other intermeshing rollers shown or described herein.

Implementations of the present invention can also include methods of incrementally stretching a film of thermoplastic material to produce visually-distinct stretched regions. The following describes at least one implementation of a method with reference to the components and diagrams of FIGS. 1A through 17. Of course, as a preliminary matter, one of ordinary skill in the art will recognize that the methods explained in detail herein can be modified to install a wide variety of configurations using one or more components of the present invention. For example, various acts of the method described can be omitted or expanded, and the order of the various acts of the method described can be altered as desired.

For example, one method in accordance with one or more implementations of the present invention can include providing a film. For example, the method can involve providing a film comprising between about 65 and about 99 percent by weight of a thermoplastic material, and between about 1 and about 35 percent by weight of a voiding agent. In particular, the method can involve extruding a film 10 and directing the film 10 into a high speed manufacturing system.

The method can also include cold stretching the film 10 incrementally to create stretched regions that are white, opaque, and non-porous. In one or more implementations this can involve imparting a pattern 36 of un-stretched regions 44 and stretched regions 46 that are visually distinct from un-stretched regions 44. For example, the method can involve MD ring rolling the film, TD ring rolling the film, DD ring rolling the film, SELF'ing the film, or a combination thereof. More specifically, the method can involve passing the film 10 through intermeshing rollers. As the film 10 passes through the intermeshing rollers, ridges can impart the pattern 36 into the film and incrementally stretch the film 10.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A thermoplastic bag, comprising:
   first and second sidewalls of a thermoplastic film that comprises linear low-density polyethylene and a voiding agent, the voiding agent being between 5 and 25 percent by weight of the first and second sidewalls, the first and second sidewalls being joined along three edges;
   a plurality of un-stretched regions formed in one or more of the first sidewall or the second sidewall, the un-stretched regions having a first average thickness; and
   a plurality of cold-stretched regions intermittently dispersed about the un-stretched regions, the cold-stretched regions having a second average thickness that is smaller than the first average thickness;
   wherein the cold-stretched regions are non-porous and more opaque than the un-stretched regions.

2. The thermoplastic bag as recited in claim 1, wherein the thermoplastic film comprises between about 65 and about 99 percent by weight of a thermoplastic material, and between 5 and 20 percent by weight of the voiding agent.

3. The thermoplastic bag as recited in claim 1, wherein a color of the cold-stretched regions differs from a color of the un-stretched regions.

4. The thermoplastic bag as recited in claim 2, wherein the voiding agent comprises calcium carbonate.

5. The thermoplastic bag as recited in claim 1, wherein the un-stretched regions are non-porous.

6. The thermoplastic bag as recited in claim 1, wherein the cold-stretched regions comprise one or more of:
   stripes extending along the thermoplastic film in a direction transverse to a direction in which the thermoplastic film was extruded;
   stripes extending along the thermoplastic film in a direction in which the thermoplastic film was extruded; or
   discontinuous strainable networks extending in a direction transverse to direction in which the thermoplastic film was extruded.

7. The thermoplastic bag as recited in claim 6, wherein the cold-stretched regions comprise:
   stripes extending along the thermoplastic film in a direction in which the thermoplastic film was extruded; and
   stripes extending along the thermoplastic film in a direction transverse to a direction in which the thermoplastic film was extruded.

8. The thermoplastic bag as recited in claim 6, wherein the cold-stretched regions comprise discontinuous strainable networks arranged in diamond patterns.

9. The thermoplastic bag as recited in claim 1, further comprising:
   a first section, the first plurality of cold-stretched regions being located entirely in the first section; and
   a second un-stretched section.

10. A thermoplastic bag, comprising:
    first and second sidewalls of a thermoplastic film that comprises a voiding agent, the voiding agent being between 5 and 20 percent by weight of the first and second sidewalls, the first and second sidewalls being joined along three edges;
    a plurality of thick regions formed in one or more of the first sidewall or the second sidewall, the thick regions having a first average thickness; and
    a plurality of cold-stretched regions alternating with the thick regions, the cold-stretched regions having a second average thickness that is smaller than the first average thickness;
    wherein the cold-stretched regions are non-porous and more opaque than the thick regions.

11. The thermoplastic bag as recited in claim 10, wherein the thermoplastic film comprises between about 65 and about 99 percent by weight of a thermoplastic material, and between about 10 and about 15 percent by weight of the voiding agent.

12. The thermoplastic bag as recited in claim 11, wherein the thermoplastic material comprises linear low density polyethylene.

13. The thermoplastic bag as recited in claim 11, wherein the voiding agent comprises calcium carbonate.

14. The thermoplastic bag as recited in claim 11, wherein the voiding agent comprises between 15 percent by weight of the thermoplastic film.

15. The thermoplastic bag as recited in claim 10, wherein a color of the cold-stretched regions differs from a color of the thick regions.

16. The thermoplastic bag as recited in claim 10, wherein an average thickness of the cold-stretched regions is less than an average thickness of the thick regions.

17. The thermoplastic bag as recited in claim 10, wherein the cold-stretched regions comprise one or more of:
    stripes extending along the thermoplastic film in a direction transverse to a direction in which the thermoplastic film was extruded;
    stripes extending along the thermoplastic film in a direction in which the thermoplastic film was extruded; or
    discontinuous strainable networks extending in a direction transverse to direction in which the thermoplastic film was extruded.

18. The thermoplastic bag as recited in claim 17, wherein the cold-stretched regions comprise:
    stripes extending along the thermoplastic film in a direction in which the thermoplastic film was extruded; and
    stripes extending along the thermoplastic film in a direction transverse to a direction in which the thermoplastic film was extruded.

19. The thermoplastic bag as recited in claim 10, wherein the cold-stretched regions comprise discontinuous strainable networks arranged in diamond patterns.

20. The thermoplastic bag as recited in claim 19, further comprising:
    a first section, the first plurality of stretched regions being located entirely in the first section; and
    a second thick section.

* * * * *